US011746900B2

(12) United States Patent
Domen et al.

(10) Patent No.: US 11,746,900 B2
(45) Date of Patent: Sep. 5, 2023

(54) AUTOMATIC TRANSMISSION

(71) Applicant: Mazda Motor Corporation, Hiroshima (JP)

(72) Inventors: Narifumi Domen, Aki-gun (JP); Kenta Fukuchi, Aki-gun (JP); Kotaro Suzuki, Aki-gun (JP); Masanori Sasaki, Aki-gun (JP); Tomotaka Ishizaka, Aki-gun (JP); Atsushi Abe, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 26 days.

(21) Appl. No.: 17/454,506

(22) Filed: Nov. 11, 2021

(65) Prior Publication Data
US 2022/0235849 A1 Jul. 28, 2022

(30) Foreign Application Priority Data
Jan. 28, 2021 (JP) .................. 2021-012311

(51) Int. Cl.
*F16H 57/10* (2006.01)
*F16H 63/34* (2006.01)
(Continued)

(52) U.S. Cl.
CPC .......... *F16H 63/34* (2013.01); *F16H 57/028* (2013.01); *F16H 57/10* (2013.01); *F16H 3/663* (2013.01);
(Continued)

(58) Field of Classification Search
CPC ............... F16H 57/028; F16H 57/10; F16H 2057/125–127; F16H 63/34;
(Continued)

(56) References Cited

U.S. PATENT DOCUMENTS 5,653,321 A * 8/1997 Takaoka .............. F16H 63/3026
192/85.41
5,765,673 A * 6/1998 Nishiyama .......... F16D 25/0638
192/85.41
(Continued)

FOREIGN PATENT DOCUMENTS

JP 2019158053 A 9/2019

*Primary Examiner* — David R Morris
(74) *Attorney, Agent, or Firm* — Alleman Hall Creasman & Tuttle LLP

(57) ABSTRACT

An automatic transmission includes a brake including a fixed-side cylindrical member spline-coupled to a transmission case, a rotation-side cylindrical member coupled to a given rotating member, a plurality of friction plates disposed between the fixed-side cylindrical member and the rotation-side cylindrical member, and including a fixed-side friction plate configured to be spline-engaged with the fixed-side cylindrical member and a rotation-side friction plate configured to be spline-engaged with the rotation-side cylindrical member, and a piston configured to engage the plurality of friction plates. The automatic transmission further includes a shock absorbing member disposed between a spline part of the transmission case and a spline part of the fixed-side cylindrical member and configured to absorb impact when the fixed-side cylindrical member rotates relative to the transmission case.

16 Claims, 15 Drawing Sheets

(51) Int. Cl.
*F16H 57/028* (2012.01)
*F16H 3/66* (2006.01)
(52) U.S. Cl.
CPC .................. *F16H 2200/006* (2013.01); *F16H 2200/2012* (2013.01); *F16H 2200/2023* (2013.01); *F16H 2200/2043* (2013.01)
(58) Field of Classification Search
CPC .......... F16H 65/0006–0018; F16H 2065/1348; F16H 2065/1396; F16D 55/36–42
See application file for complete search history.

(56) References Cited

U.S. PATENT DOCUMENTS

| | | |
|---|---|---|
| 10,774,924 B2 | 9/2020 | Yamakawa et al. |
| 2002/0112935 A1* | 8/2002 | Helmstadter ......... B41F 13/008 192/70.19 |
| 2019/0285167 A1* | 9/2019 | Yamakawa ......... F16H 57/0473 |

* cited by examiner

|  | CL1 | CL2 | CL3 | BR1 | BR2 |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

← DRIVE SOURCE SIDE   ANTI-DRIVE SOURCE SIDE →

DRIVE SOURCE SIDE  ANTI-DRIVE SOURCE SIDE

AUTOMATIC TRANSMISSION

TECHNICAL FIELD

The present disclosure relates to an automatic transmission mounted on a vehicle.

BACKGROUND OF THE DISCLOSURE

An automatic transmission mounted on a vehicle generally includes a plurality of planetary gear mechanisms (planetary gear sets), and a plurality of friction engagement elements, such as a clutch and a brake. The automatic transmission selectively engages the plurality of friction engagement elements so as to switch a power transmission path via each planetary gear mechanism, and thus, a transmission gear stage corresponding to an operation state of the vehicle is achieved.

For example, JP2019-158053A discloses an automatic transmission provided with four planetary gear mechanisms and five friction engagement elements including three clutches and two brakes, and selectively engages three of the five friction engagement elements so as to achieve eight forward gear stages and one reverse gear stage.

JP2019-158053A discloses a brake having a fixed-side cylindrical member which is spline-coupled to a transmission case, and a rotation-side cylindrical member which is coupled to a given rotating element constituting the planetary gear mechanism. The outer circumferential side of the fixed-side cylindrical member of the brake is engaged with fixed-side friction plates having spline parts at the inner circumferential side, and the inner circumferential side of the rotation-side cylindrical member is engaged with rotation-side friction plates having spline parts at the outer circumferential side. The fixed-side friction plates and the rotation-side friction plates are alternately disposed between the fixed-side cylindrical member and the rotation-side cylindrical member.

Between tooth surfaces of the transmission case and the fixed-side cylindrical member which are spline-coupled to each other, a gap (backlash) for smooth meshing is provided. Therefore, after the fixed-side cylindrical member rotates about its axis with respect to the transmission case by the amount of the backlash, the tooth surface of the fixed-side cylindrical member contacts the tooth surface of the transmission case so that the rotation of the fixed-side cylindrical member is received.

Conventionally, since the backlash is provided at the spline-engagement part, the brake disclosed in JP2019-158053A is provided with the backlash at three points, between the rotation-side cylindrical member and the rotation-side friction plates, between the fixed-side cylindrical member and the fixed-side friction plates, and between the fixed-side cylindrical member and the transmission case. Therefore, the backlash between the fixed-side cylindrical member and the transmission case is set to be larger than those at the other parts so as to absorb backlash at the other parts.

However, in a case where the backlash between the fixed-side cylindrical member and the transmission case is set to be larger, when input torque is transmitted from the engine side to a drive wheel side, the backlash between the fixed-side cylindrical member and the transmission case is rapidly made smaller by the torque inputted into a ring gear. As a result, the tooth surfaces instantaneously collide with each other and teeth rattling noise may be caused. Such teeth rattling noise is also caused in a driven state where rotational force is transmitted from a drive wheel to the engine by coasting of the drive wheel.

SUMMARY OF THE DISCLOSURE

The present disclosure is made in view of the above situations, and one purpose thereof is to provide an automatic transmission provided with a brake having a fixed-side cylindrical member spline-coupled to a transmission case, and capable of reducing a teeth rattling noise between the transmission case and the fixed-side cylindrical member.

According to one aspect of the present disclosure, an automatic transmission is provided, which includes a brake including a fixed-side cylindrical member spline-coupled to a transmission case, a rotation-side cylindrical member coupled to a given rotating member, a plurality of friction plates disposed between the fixed-side cylindrical member and the rotation-side cylindrical member, and including a fixed-side friction plate configured to be spline-engaged with the fixed-side cylindrical member and a rotation-side friction plate configured to be spline-engaged with the rotation-side cylindrical member, and a piston configured to engage the plurality of friction plates. The automatic transmission includes a shock absorbing member disposed between a spline part of the transmission case and a spline part of the fixed-side cylindrical member and configured to absorb impact when the fixed-side cylindrical member rotates relative to the transmission case.

According to this configuration, the shock absorbing member is disposed between the spline parts of the transmission case and the fixed-side cylindrical member so that the impact when the fixed-side cylindrical member rotates relative to the transmission case can be absorbed. Therefore, a teeth rattling noise caused when a tooth surface of the fixed-side cylindrical member contacts a tooth surface of the transmission case can be reduced.

For example, when the brake is engaged in a driving state and a drive force from a driving source is transmitted to the fixed-side cylindrical member via the given rotating member, the rotation-side cylindrical member, and the plurality of friction plates, backlash between the fixed-side cylindrical member and the transmission case is rapidly made smaller by the drive force transmitted to the fixed-side cylindrical member, which causes the teeth rattling noise when the tooth surface of the fixed-side cylindrical member contacts the tooth surface of the transmission case. In this regard, by the shock absorbing member disposed between the spline parts of the transmission case and the fixed-side cylindrical member, the rotation of the fixed-side cylindrical member with respect to the transmission case can be reduced (the rotating speed is slowed down), and by the backlash between the tooth surface of the fixed-side cylindrical member and the tooth surface of the transmission case being made smaller, the teeth rattling noise is reduced.

A position of the fixed-side cylindrical member may be regulated in an axial direction by a fixed-side holding member fixed to the transmission case.

According to this configuration, the axial position of the fixed-side cylindrical member can be regulated in a configuration where the fixed-side cylindrical member is spline-coupled to the transmission case.

The rotation-side cylindrical member may be disposed opposing, and radially outward, of the fixed-side cylindrical member.

According to this configuration, compared with a case where the rotation-side cylindrical member is disposed radially inward, the centrifugal force caused by the rotation of the rotation-side cylindrical member disposed radially outward can efficiently lubricate the friction plates.

The shock absorbing member may include a first shock absorbing member disposed between a tooth surface of the spline part of the transmission case at a first side in a rotational direction, and a tooth surface of the spline part of the fixed-side cylindrical member at a second side in the rotational direction, and a second shock absorbing member disposed between a tooth surface of the spline part of the transmission case at the second side in the rotational direction, and a tooth surface of the spline part of the fixed-side cylindrical member at the first side in the rotational direction.

According to this configuration, the teeth rattling noise caused between the tooth surface of the fixed-side cylindrical member at the second rotational direction side and the tooth surface of the transmission case at the first rotational direction side can be reduced by the first shock absorbing member. The teeth rattling noise caused between the tooth surface of the fixed-side cylindrical member at the first rotational direction side and the tooth surface of the transmission case at the second rotational direction side can be reduced by the second shock absorbing member. Thus, the teeth rattling noise can be reduced both in the driving state and a driven state.

The first shock absorbing member may include a first spring being a coil spring, and the second shock absorbing member may include a second spring being a coil spring. A spring constant of the shock absorbing member may be set based on a net spring constant of the first spring and the second spring.

According to this configuration, compared with a case where the shock absorbing member is comprised of either one of the first shock absorbing member and the second shock absorbing member, the teeth rattling noise can be reduced without excessively increasing the spring constant of the first spring or the second spring. Moreover, compared with the case where only the first shock absorbing member or the second shock absorbing member is provided, in the case where the spring constant of the shock absorbing member is set based on the net spring constant of the first spring and the second spring, the spring constant of each member can be reduced, thus the assembling of the shock absorbing member being easier.

The shock absorbing member may be disposed in a compressed state.

According to this configuration, the state where the shock absorbing member is applied with load beforehand (preload) can be achieved in the neutral state where torque is not inputted into the fixed-side cylindrical member. Therefore, compared with a case where the shock absorbing member is not applied with load beforehand, the load required for rotating the fixed-side cylindrical member with respect to the transmission case is increased, and the rotation of the fixed-side cylindrical member relative to the transmission case can be reduced.

Further, compared with the case where the shock absorbing member is not applied with load beforehand, the rotation of the fixed-side cylindrical member with respect to the transmission case can be reduced even when larger torque is inputted into the fixed-side cylindrical member. For example, in order to increase the number of gear stages for improving fuel efficiency, when a path length of a power transmission member which couples a rotating member of a planetary gear mechanism and a friction engagement element etc. is made longer, the inertial of the power transmission member becomes larger and the torque inputted into the fixed-side cylindrical member is increased. However, since the shock absorbing member is applied with load beforehand, the rotation of the fixed-side cylindrical member with respect to the transmission case can be suppressed.

A spline tooth of the spline part of the transmission case may be formed such that the width in a circumferential direction becomes narrower from a first side to a second side in the axial direction.

According to this configuration, the interval between the adjacent spline teeth of the transmission case increases as it goes from the first axial direction side to the second axial direction side. For example, when the fixed-side cylindrical member and the shock absorbing member are assembled to the spline part of the transmission case from the second axial direction side to the first axial direction side, they can be assembled while the shock absorbing member is gradually compressed from the second axial direction side to the first axial direction side. Accordingly, compared to a case where the shock absorbing member is assembled to spline teeth with a constant width in the circumferential direction while maintaining the compressed state which is set for after assembly, the assembling can be easier.

BRIEF DESCRIPTION OF DRAWINGS

FIG. 2 is an engagement table for friction engagement elements of the automatic transmission.

DETAILED DESCRIPTION OF THE DISCLOSURE

Hereinafter, one embodiment of the present disclosure is described with reference to the accompanying drawings.

Figure 1:
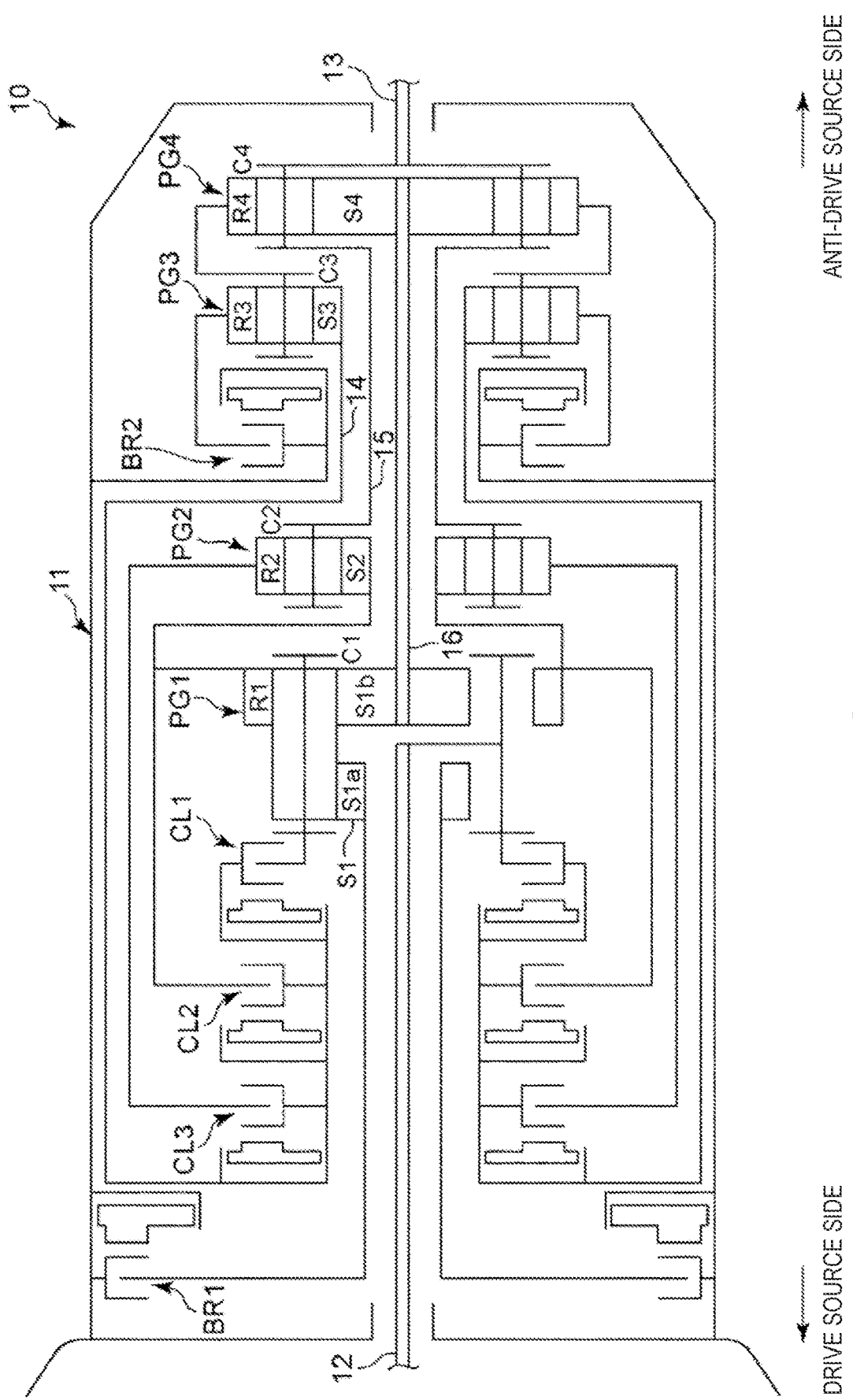
FIG. 1 is a view schematically illustrating an automatic transmission according to one embodiment of the present disclosure.

FIG. 1 is a view schematically illustrating an automatic transmission according to one embodiment of the present disclosure. The automatic transmission 10 is coupled to a drive source, such as an engine, without an intervention of a hydraulic power transmission, such as a torque converter. The automatic transmission 10 has an input shaft 12 which is coupled to the drive source and disposed inside a transmission case 11 at a drive source side (left side in this figure), and an output shaft 13 disposed at an anti-drive source side (right side in this figure). The automatic transmission 10 is a longitudinal type, such as for front-engine rear-drive (FR) vehicles, in which the input shaft 12 and the output shaft 13 are disposed coaxially.

On the axis of the input shaft 12 and the output shaft 13, first, second, third, and fourth planetary gear sets PG1, PG2, PG3, and PG4 (hereinafter, simply referred to as "first, second, third, and fourth gear sets") are disposed from the drive source side.

Inside the transmission case 11, a first clutch CL1 is disposed on the drive source side of the first gear set PG1, a second clutch CL2 is disposed on the drive source side of the first clutch CL1, and a third clutch CL3 is disposed on the drive source side of the second clutch CL2. Moreover, a first brake BR1 is disposed on the drive source side of the third clutch CL3, and a second brake BR2 is disposed on the drive source side of the third gear set PG3 and on the anti-drive source side of the second gear set PG2.

The first, second, third, and fourth gear sets PG1, PG2, PG3, and PG4 are each a single-pinion type in which a pinion supported by a carrier directly meshes with a sun gear and a ring gear. The first, second, third, and fourth gear sets PG1, PG2, PG3, and PG4 have, as rotating elements, sun gears S1, S2, S3, and S4, ring gears R1, R2, R3, and R4, and carriers C1, C2, C3, and C4, respectively.

The first gear set PG1 is a double sun gear type in which the sun gear S1 is divided into two in the axial direction. The sun gear S1 has a first sun gear S1$a$ disposed at the drive source side, and a second sun gear S1$b$ disposed at the anti-drive source side. The first and second sun gears S1$a$ and S1$b$ have the same number of teeth, and mesh with the same pinions supported by the carrier C1. Therefore, the first and second sun gears S1$a$ and S1$b$ always carry out the same rotation.

In the automatic transmission 10, the sun gear S1 of the first gear set PG1 (in detail, the second sun gear S1$b$) is always coupled to the sun gear S4 of the fourth gear set PG4, the ring gear R1 of the first gear set PG1 is always coupled to the sun gear S2 of the second gear set PG2, the carrier C2 of the second gear set PG2 is always coupled to the carrier C4 of the fourth gear set PG4, and the carrier C3 of the third gear set PG3 is always coupled to the ring gear R4 of the fourth gear set PG4.

The input shaft 12 is always coupled to the carrier C1 of the first gear set PG1 through between the first sun gear S1$a$ and the second sun gear S1$b$, and the output shaft 13 is always coupled to the carrier C4 of the fourth gear set PG4.

The first clutch CL1 is disposed between the input shaft 12 and the carrier C1 of the first gear set PG1, and the sun gear S3 of the third gear set PG3, to engage and disengage therebetween. The second clutch CL2 is disposed between the ring gear R1 of the first gear set PG1 and the sun gear S2 of the second gear set PG2, and the sun gear S3 of the third gear set PG3, to engage and disengage therebetween. The third clutch CL3 is disposed between the ring gear R2 of the second gear set PG2 and the sun gear S3 of the third gear set PG3, to engage and disengage therebetween.

The first brake BR1 is disposed between the transmission case 11 and the sun gear S1 of the first gear set PG1 (in detail, the first sun gear S1$a$), to engage and disengage therebetween, and the second brake BR2 is disposed between the transmission case 11 and the ring gear R3 of the third gear set PG3, to engage and disengage therebetween.

With the above structure, as illustrated in FIG. 2, the automatic transmission 10 forms the first to eighth gears in a D-range and the reverse gear in a R-range by a combination of the engagement state of the first clutch CL1, the second clutch CL2, the third clutch CL3, the first brake BR1, and the second brake BR2.

In the automatic transmission 10, the second brake BR2 which is engaged at the first gear stage when a vehicle starts traveling corresponds to a brake of the automatic transmission according to the present disclosure. Below, the brake BR2 is described.

Figure 3:
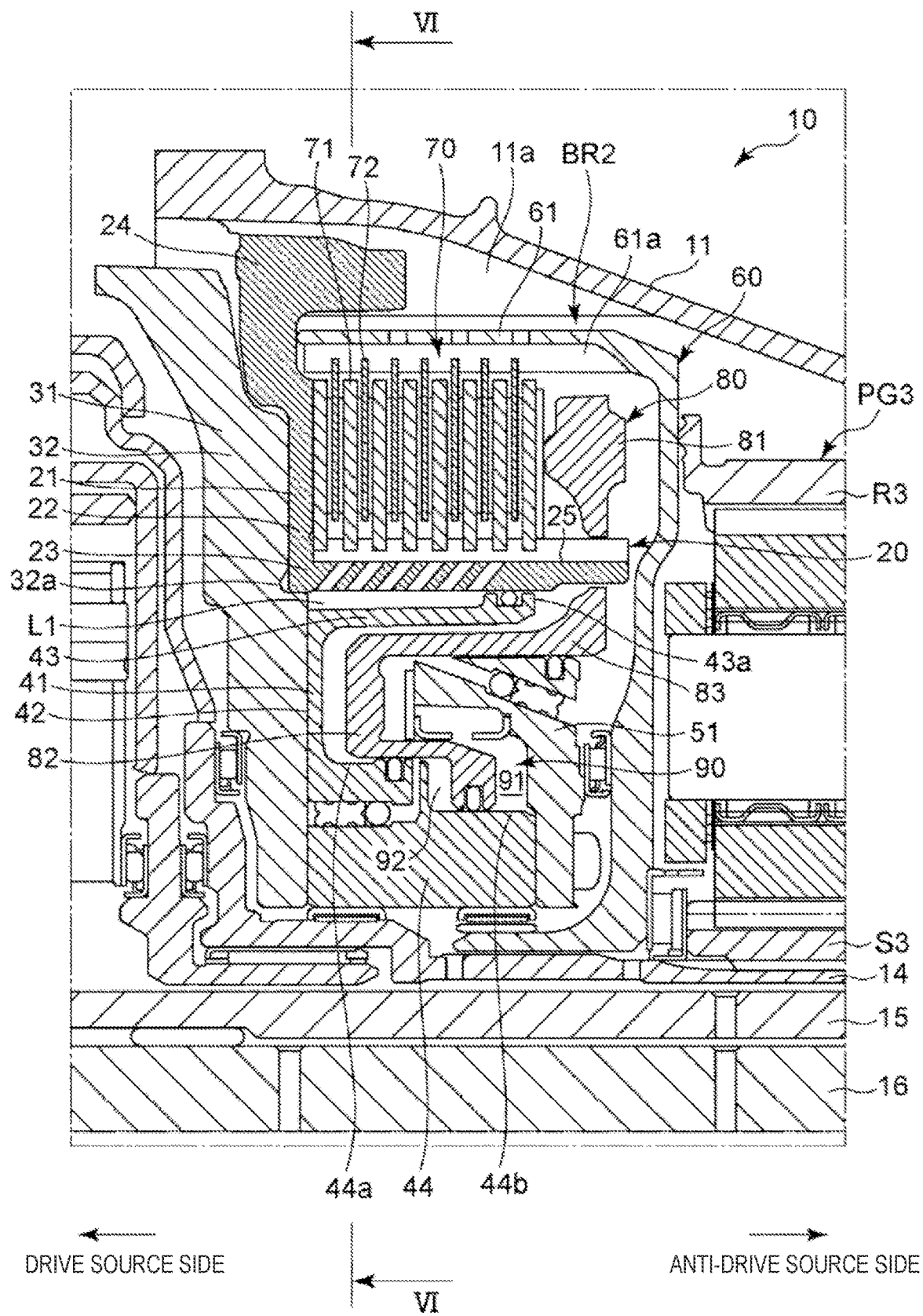
FIG. 3 is a cross-sectional view of a brake of the automatic transmission, and the periphery thereof.
Figure 4:
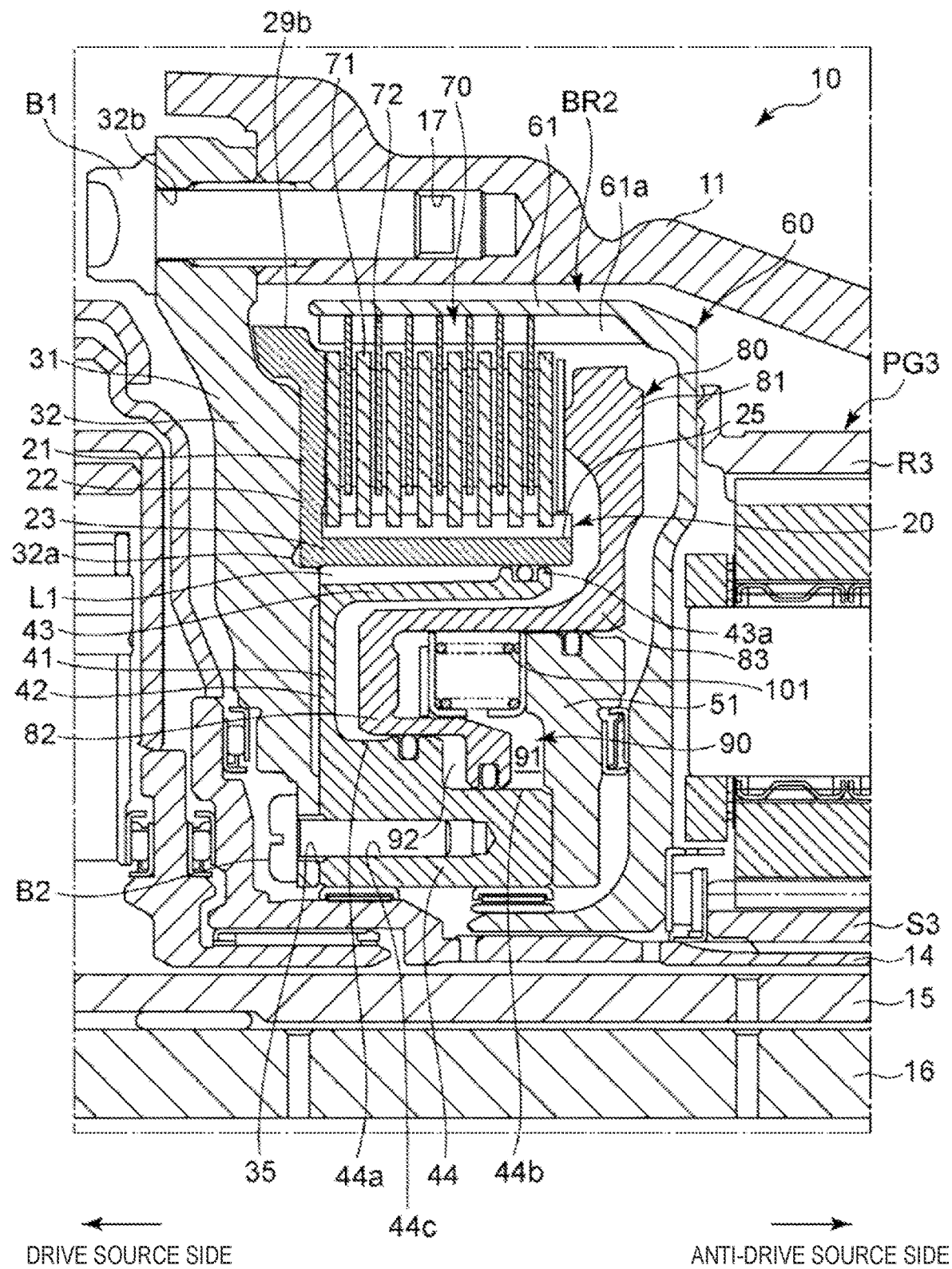
FIG. 4 is another cross-sectional view of the brake of the automatic transmission, and the periphery thereof.
Figure 5:
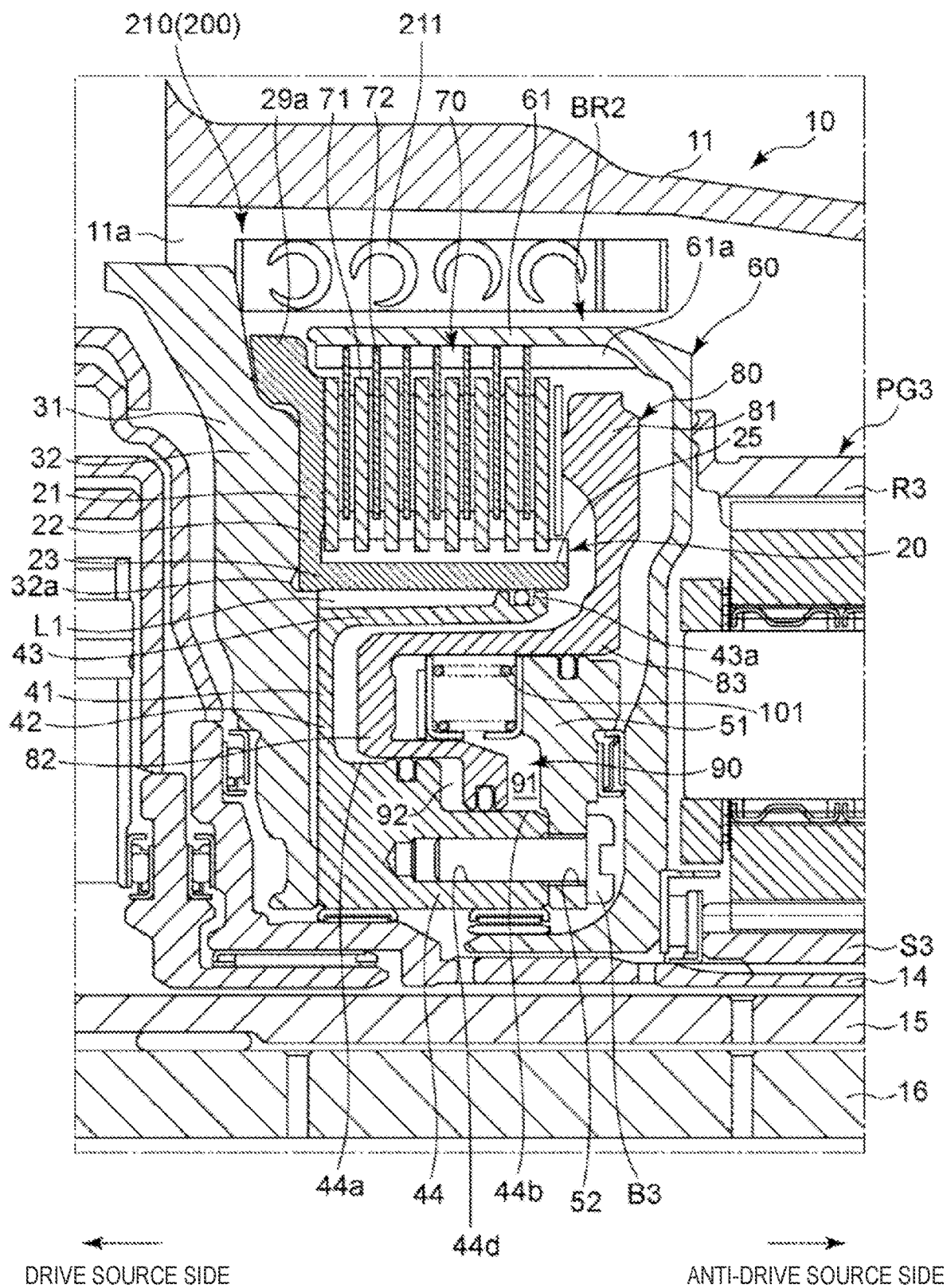
FIG. 5 is still another cross-sectional view of the brake of the automatic transmission, and the periphery thereof.
Figure 6:
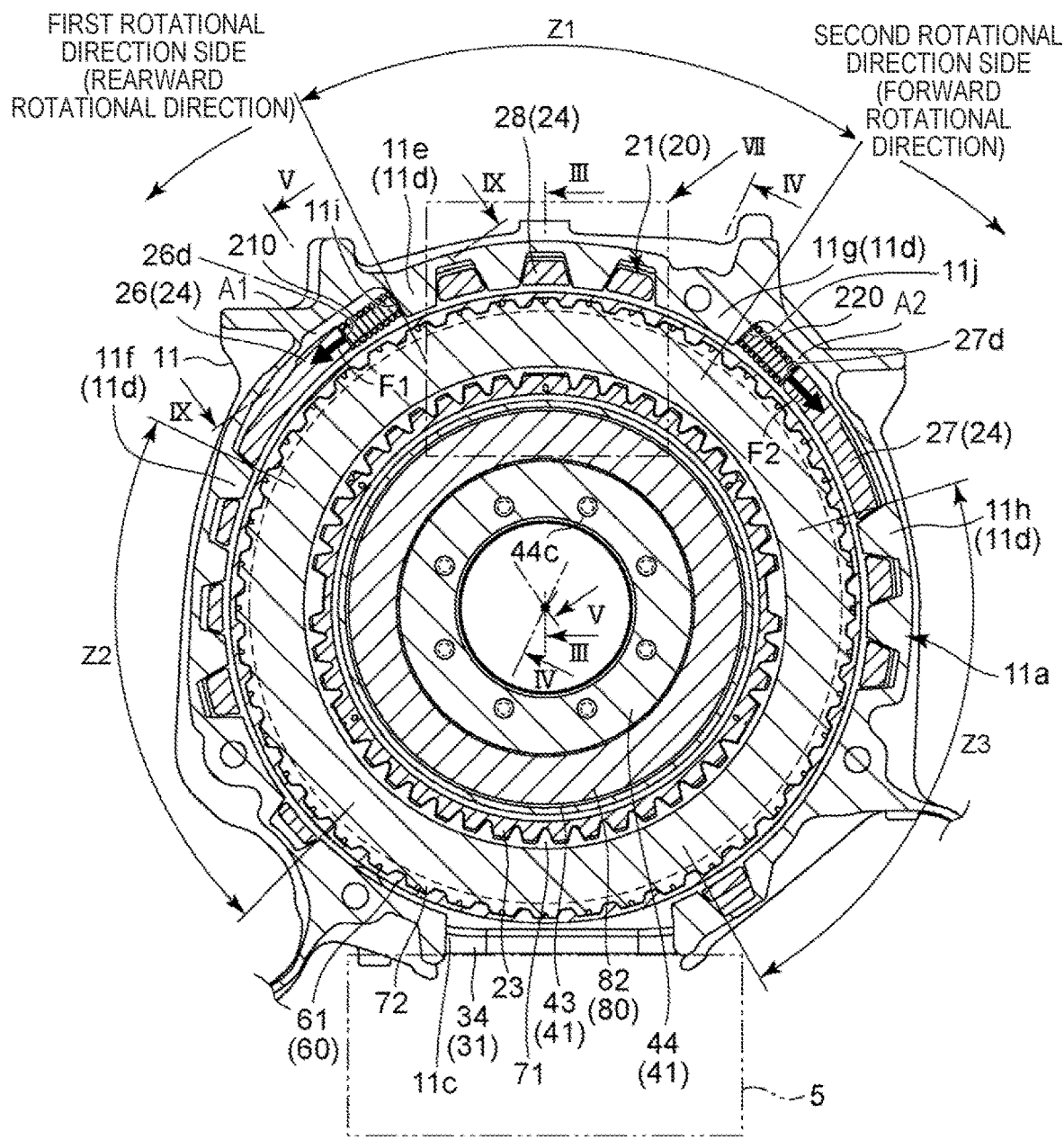
FIG. 6 is a cross-sectional view of the brake of the automatic transmission and the periphery thereof, taken along a line VI-VI of FIG. 3.

FIG. 3 is a cross-sectional view of the brake of the automatic transmission and its periphery, FIG. 4 is another cross-sectional view of the brake and its periphery, and FIGS. 5 and 6 are still other cross-sectional views of the brake and its periphery. FIGS. 3, 4, and 5 illustrate the cross-sectional views of the brake and its periphery corresponding to the cross sections taken along lines IV-IV, and V-V in FIG. 6, respectively.

As illustrated in FIGS. 3 to 6, the brake BR2 is accommodated in the transmission case 11 formed in a substantially cylindrical shape, and is disposed on the outer circumferential side of a power transmission member 14 which is coupled to the sun gear S3 of the third gear set PG3 and with which one of a pair of inner and outer rotating members of each of the first, second, and third clutches CL1, CL2, and CL3 is integrated.

The power transmission member 14 is disposed on the outer circumferential side of a power transmission member 15 which couples the carrier C2 of the second gear set PG2 to the carrier C4 of the fourth gear set PG4. The power transmission member 15 is disposed on the outer circumferential side of a power transmission member 16 which couples the sun gear S1 of the first gear set PG1 (in detail, the second sun gear S1$b$) to the sun gear S4 of the fourth gear set PG4.

The brake BR2 includes a hub member 20 which is coupled to the transmission case 11, a drum member 60 which is disposed on the anti-drive source side of the hub member 20 as a rotation-side cylindrical member, and is coupled to the ring gear R3 of the third gear set PG3 which is a given rotating member, a plurality of friction plates 70 which are lined up in the axial direction between the hub member 20 and the drum member 60, and a piston 80 which is disposed on the anti-drive source side of the plurality of friction plates 70 and engages the plurality of friction plates 70.

The brake BR2 has, at radially inward of the friction plates 70, a hydraulic chamber 90 to which hydraulic fluid for biasing the piston 80 is supplied. The hydraulic chamber 90 includes a hydraulic chamber 91 for engagement (engagement hydraulic chamber 91) to which hydraulic fluid for engagement which biases the piston 80 in the engaging direction is supplied, and a hydraulic chamber 92 for disengagement (disengagement hydraulic chamber 92) to which hydraulic fluid for disengagement which biases the piston 80 in the disengaging direction is supplied.

As illustrated in FIG. 4, the brake BR2 has, at the radially inward of the friction plates 70, a spring 101 which causes a biasing force in the engaging direction to act on the piston 80 as a biasing member for biasing the piston 80.

As illustrated in FIGS. 3 to 5, the hub member 20 includes a first hub member 21 as a fixed-side cylindrical member which is spline-engaged with and coupled to the friction plates 70 and the transmission case 11, a second hub member 31 as a fixed-side holding member, which is disposed on the drive source side of the first hub member 21 and fixed to the transmission case 11 so as to extend to radially inward of the first hub member 21, a third hub member 41 which is coupled to the anti-drive source side of the second hub member 31 at the radially inward of the first hub member 21, and a fourth hub member 51 which is coupled to the anti-drive source side of the third hub member 41 at the radially inward of the first hub member 21.

As illustrated in FIG. 3, the first hub member 21 includes a vertical wall part 22 which extends in a direction perpendicular to the axial direction of the transmission case 11 and is formed in a substantially disk shape, and a cylindrical part 23 which extends substantially cylindrically to the anti-driving-source side from radially inward of the vertical wall part 22.

The first hub member 21 has a spline part 24 where a spline is formed in an outer circumferential surface of the vertical wall part 22, and the first hub member 21 is spline-coupled to the transmission case 11 by the spline part 24 being spline-engaged with a spline part 11a which is formed in an inner circumferential surface of the transmission case 11. Between the first hub member 21 and the transmission case 11, a gap (backlash) G for smooth meshing is formed (see FIG. 7). The coupling between the spline part 24 of the first hub member 21 and the spline part 11a of the transmission case 11 will be described later in detail.

The cylindrical part 23 of the first hub member 21 has a spline part 25 where a spline is formed in an outer circumferential surface, and the spline part 25 is spline-engaged with fixed-side friction plates 71 which constitute the friction plates 70. Between the spline part 25 of the first hub member 21 and the fixed-side friction plates 71, backlash g2 for smooth meshing is provided (see FIG. 7). The second hub member 31 includes a vertical wall part 32 which extends in a direction perpendicular to the axial direction of the transmission case 11 and is formed in a substantially disk shape. The vertical wall part 32 of the second hub member 31 is formed with a lubrication oil supply passage (not illustrated) for supplying hydraulic fluid for lubrication to the friction plates 70.

As illustrated in FIG. 4, the second hub member 31 is formed, at a part radially outward of the vertical wall part 32, with a through-hole 32b thorough which a bolt B1 for fixing the second hub member 31 to the transmission case 11 is inserted. At an inner circumferential side of the transmission case 11, a bolt hole 17 to be threadedly engaged with the bolt B1 is formed at a position corresponding to the through-hole 32b of the vertical wall part 32. The second hub member 31 is fixed and coupled to the transmission case 11 by using the bolt B1. The vertical wall part 32 of the second hub member 31 is formed with a plurality of thorough-holes 35 penetrating the vertical wall part 32 in the axial direction at the inner circumferential side. The plurality of thorough-holes 35 are provided dispersedly in the circumferential direction.

As illustrated in FIG. 6, below the transmission case 11, a valve body 5 which supplies hydraulic fluid to the hydraulic chamber 90 and the friction plates 70 of the brake BR2 is disposed. The valve body 5 is fixed to the transmission case 11 by being accommodated in an oil pan (not illustrated) attached below the transmission case 11. The second hub member 31 has a valve body connecting part 34 for connecting to the valve body 5, and it is formed so that the lubrication oil supply passage, an engagement oil supply passage which supplies hydraulic fluid for engagement to the engagement hydraulic chamber 91, and a disengagement oil supply passage which supplies hydraulic fluid for disengagement to the disengagement hydraulic chamber 92, are connected to the valve body 5 through a case opening 11c formed in the transmission case 11.

As illustrated in FIG. 3, on the anti-driving-source side of the vertical wall part 32 of the second hub member 31, a stepped part 32a which is dented to the driving-source side is formed. The stepped part 32a of the second hub member 31 is formed so as to engage with the inner circumferential side of the vertical wall part 22 of the first hub member 21, when the vertical wall part 32 of the second hub member 31 contacts the vertical wall part 22 of the first hub member 21.

As illustrated in FIG. 3, the third hub member 41 is provided with a vertical wall part 42 which extends in a direction perpendicular to the axial direction of the transmission case 11 and is formed in a substantially disk shape, a first cylindrical part 43 which extends substantially cylindrically to the anti-drive source side from radially outward of the vertical wall part 42, and a second cylindrical part 44 which extends substantially cylindrically to the anti-drive source side from radially inward of the vertical wall part 42. The first cylindrical part 43 and the second cylindrical part 44 are formed to have the substantially same length in the axial direction.

The first cylindrical part 43 of the third hub member 41 is provided at radially inward of the cylindrical part 23 of the first hub member 21. The first cylindrical part 43 of the third hub member 41 is provided with a flange part 43a at the anti-drive source side, which extends radially outwardly so as to contact the inner circumferential surface of the cylindrical part 23 of the first hub member 21. An oil supply passage L1 for lubrication is formed between the first cylindrical part 43 of the third hub member 41 and the cylindrical part 23 of the first hub member 21.

The second cylindrical part 44 of the third hub member 41 has an outer circumferential surface 44a at the drive source side, and an outer circumferential surface 44b at the anti-drive source side. The outer circumferential surface 44b at the anti-drive source side is formed to be smaller in a radial dimension compared with the outer circumferential surface 44a at the drive source side so as to form the disengagement hydraulic chamber 92.

Moreover, as illustrated in FIGS. 4 and 5, a threaded hole 44c to be engaged with a bolt B2 from the driving-source side, and a threaded hole 44d to be engaged with a bolt B3 from the anti-driving-source side, are formed in the second cylindrical part 44 of the third hub member 41.

The fourth hub member 51 is disposed on the anti-drive source side of the third hub member 41 so as to extend in a direction perpendicular to the axial direction of the transmission case 11 and be formed in a substantially disk shape. A plurality of through-holes 52 penetrating in the axial direction are formed at the radially inward of the fourth hub member 51.

The bolt B2 is threadedly engaged with the threaded hole 44c of the third hub member 41 from the drive source side through the through-hole 35 of the second hub member 31, and the bolt B3 is threadedly engaged with the threaded hole 44d of the third hub member 41 from the anti-drive source side through the through-holes 52 of the fourth hub member 51. Accordingly, the third hub member 41 is coupled to the anti-drive source side of the second hub member 31, and the fourth hub member 51 is coupled to the anti-drive source side of the third hub member 41.

The fourth hub member 51 is formed to extend radially outward of the second cylindrical part 44 of the third hub member 41, and an outer circumferential surface of the fourth hub member 51 is fitted to the piston 80.

In the hub member 20, the first hub member 21, the second hub member 31, the third hub member 41, and the fourth hub member 51 are made of the same aluminum-based material.

The drum member 60 includes a cylindrical part 61 which is disposed opposing the outer circumferential side of the cylindrical part 23 of the first hub member 21, and extends substantially cylindrically in the axial direction, and a vertical wall part which extends radially inwardly from the anti-drive source side of the cylindrical part 61 in a direction perpendicular to the axial direction of the transmission case 11, and is formed in a substantially disk shape.

The vertical wall part of the drum member 60 is coupled to the ring gear R3 as a rotating member. The cylindrical part 61 of the drum member 60 has a spline part 61a where spline is formed on the inner circumferential surface, and the spline part 61a is spline-engaged with rotation-side friction plates 72 which constitute the friction plates 70. Between the spline part 61a of the drum member 60 and the rotation-side friction plates 72, backlash g1 for smooth meshing is provided (see FIG. 7). The fixed-side friction plates 71 and the rotation-side friction plates 72 are disposed alternately in the axial direction.

The piston 80 is disposed between the hub member 20 and the drum member 60 (in detail, between the cylindrical part 23 of the first hub member 21 and the cylindrical part 61 of the drum member 60), and is slidably fitted onto the outer circumferential surface of the second cylindrical part 44 of the third hub member 41.

The piston 80 is formed annularly, and includes, as illustrated in FIG. 3, a pressing part 81 which is provided at the outer circumferential side and presses the friction plates 70, a hydraulic chamber forming part 82 which is provided at the inner circumferential side and forms the hydraulic chamber 90, and a coupling part 83 which couples the pressing part 81 to the hydraulic chamber forming part 82.

The pressing part 81 of the piston 80 is disposed on the anti-drive source side of the friction plates 70, the hydraulic chamber forming part 82 is disposed radially inward of the friction plates 70, and the coupling part 83 extends to the radially inward of the friction plates 70 from the anti-drive source side of the friction plates 70 so that it couples the pressing part 81 to the hydraulic chamber forming part 82.

The hydraulic chamber forming part 82 extends to the drive source side from an inner-end part of the coupling part 83, and extends radially inwardly from an end part at the driving-source side so as to be fitted to the outer circumferential surface 44a of the second cylindrical part 44 of the third hub member 41. In this manner, the engagement hydraulic chamber 91 is formed by a space defined by the hydraulic chamber forming part 82, the third hub member 41, and the fourth hub member 51. The disengagement hydraulic chamber 92 is formed by a space defined by the hydraulic chamber forming part 82 and the third hub member 41.

As illustrated in FIG. 4, the spring 101 is disposed inside the engagement hydraulic chamber 91. The hydraulic chamber forming part 82 which forms the engagement hydraulic chamber 91 receives, at the anti-drive source side, biasing force from the spring 101. The spring 101, and the engagement hydraulic chamber 91 and the disengagement hydraulic chamber 92 are disposed at positions overlapping with each other in the radial direction at the radially inward of the plurality of friction plates 70.

Figure 8:
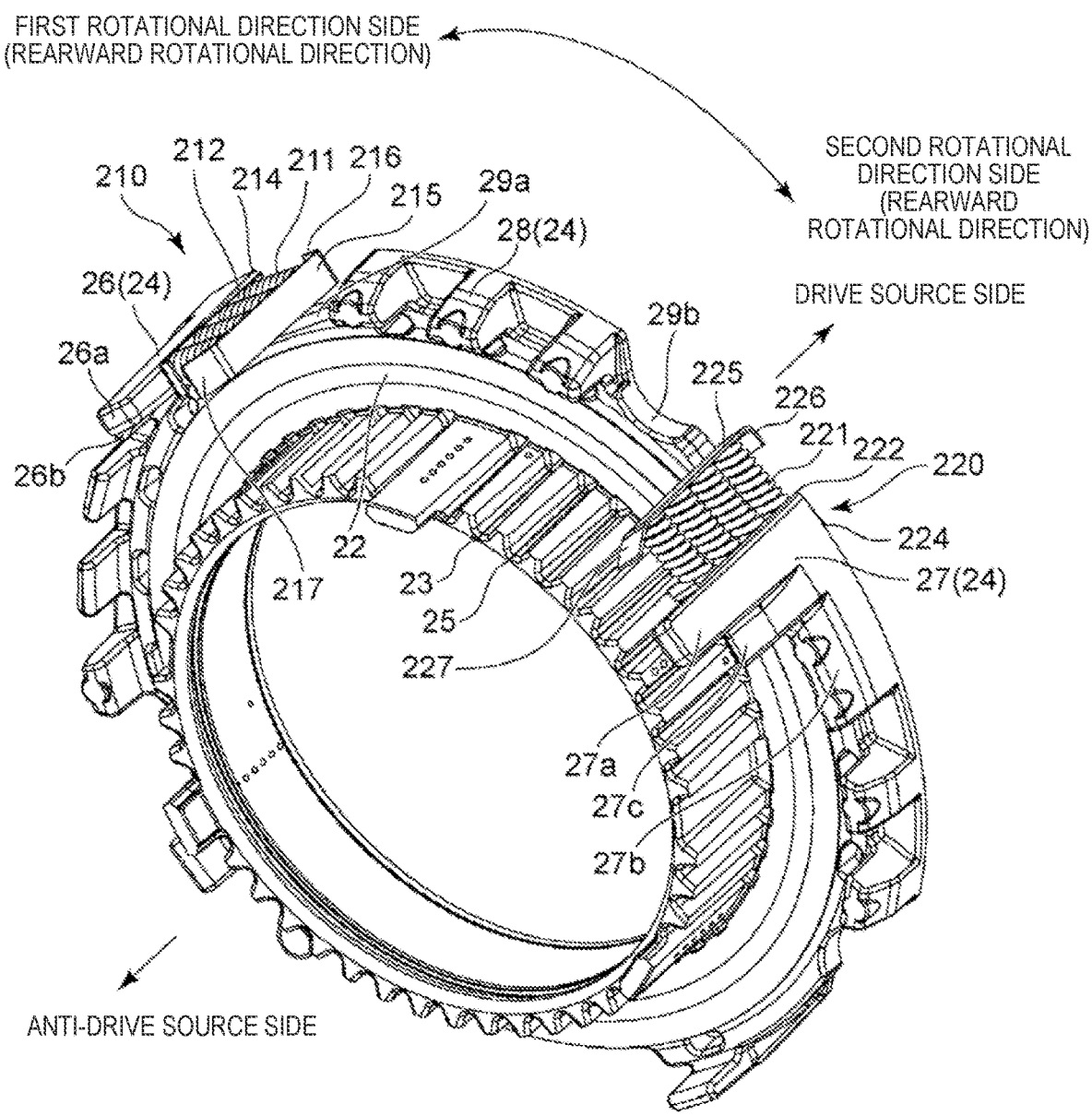
FIG. 8 is a perspective view illustrating an assembled state of a first hub member and a shock absorbing member of the brake.

FIG. 6 is a cross-sectional view of the brake BR2 and the transmission case 11, taken along a line VI-VI of FIG. 3. FIG. 8 is a perspective view illustrating a state where a shock absorbing member is assembled to the first hub member 21.

As illustrated in FIG. 6, on the inner circumferential surface of the transmission case 11, the spline part 11a having a plurality of spline teeth 11d which are engaged with the spline part 24 of the first hub member 21 is formed. The plurality of spline teeth 11d are disposed in an upper range Z1 located at the upper side of the transmission case 11, a first-side range Z2 on a first side of the upper range Z1 in the rotational direction, and a second-side range Z3 on a second side of the upper range Z1 in the rotational direction.

The inner circumferential surface of the transmission case 11 is further provided with first and second shock-absorbing-member accommodating spaces A1 and A2 in which first and second damper spline teeth 26 and 27 for damping of the first hub member 21 (described later) and first and second shock absorbing members 210 and 220 are accommodated, respectively.

The first shock-absorbing-member accommodating space A1 is disposed on a first side of the upper end part of the transmission case 11 in the rotational direction (first rotational direction side), and the second shock-absorbing-member accommodating space A2 disposed on a second side in the rotational direction (second rotational direction side). The first shock-absorbing-member accommodating space A1 is provided between the upper range Z1 and the first-side range Z2, and the second shock-absorbing-member accommodating space A2 is provided between the upper range Z1 and the second-side range Z3.

The first shock-absorbing-member accommodating space A1 is defined by a spline tooth 11e located at the first rotational direction side (i.e., rearward in the rotational direction in the driving state) at most among the spline teeth 11d in the upper range Z1, and a spline tooth 11f located at the second rotational direction side (i.e., forward in the rotational direction in the driving state) at most among the spline teeth 11d in the first-side range Z2. The second shock-absorbing-member accommodating space A2 is defined by a spline tooth 11g located at the second rotational direction side at most among the spline teeth 11d in the upper range Z1, and a spline tooth 11h located at the first rotational direction side at most among the spline teeth 11d in the second-side range Z3.

The plurality of spline teeth 11d are engaged with a plurality of spline teeth 28 of the first hub member 21 other than the damper spline teeth 26 and 27 (described later), and the shock-absorbing-member accommodating spaces A1 and A2 accommodate the shock absorbing members 210 and 220, and the damper spline teeth 26 and 27 of the first hub member 21, respectively.

As illustrated in FIGS. 6 and 8, the first hub member 21 is provided with the spline part 24 which extends to the anti-drive source side from the outer circumferential side of the vertical wall part 22. The spline part 24 includes the damper spline teeth 26 and 27 to which a shock absorbing member 200 (the shock absorbing members 210 and 220) which absorbs an impact when the first hub member 21 rotates relative to the transmission case 11 and collides against it is attached, and the plurality of spline teeth 28 formed to be shorter in the circumferential direction compared with the damper spline teeth 26 and 27.

Figure 7:
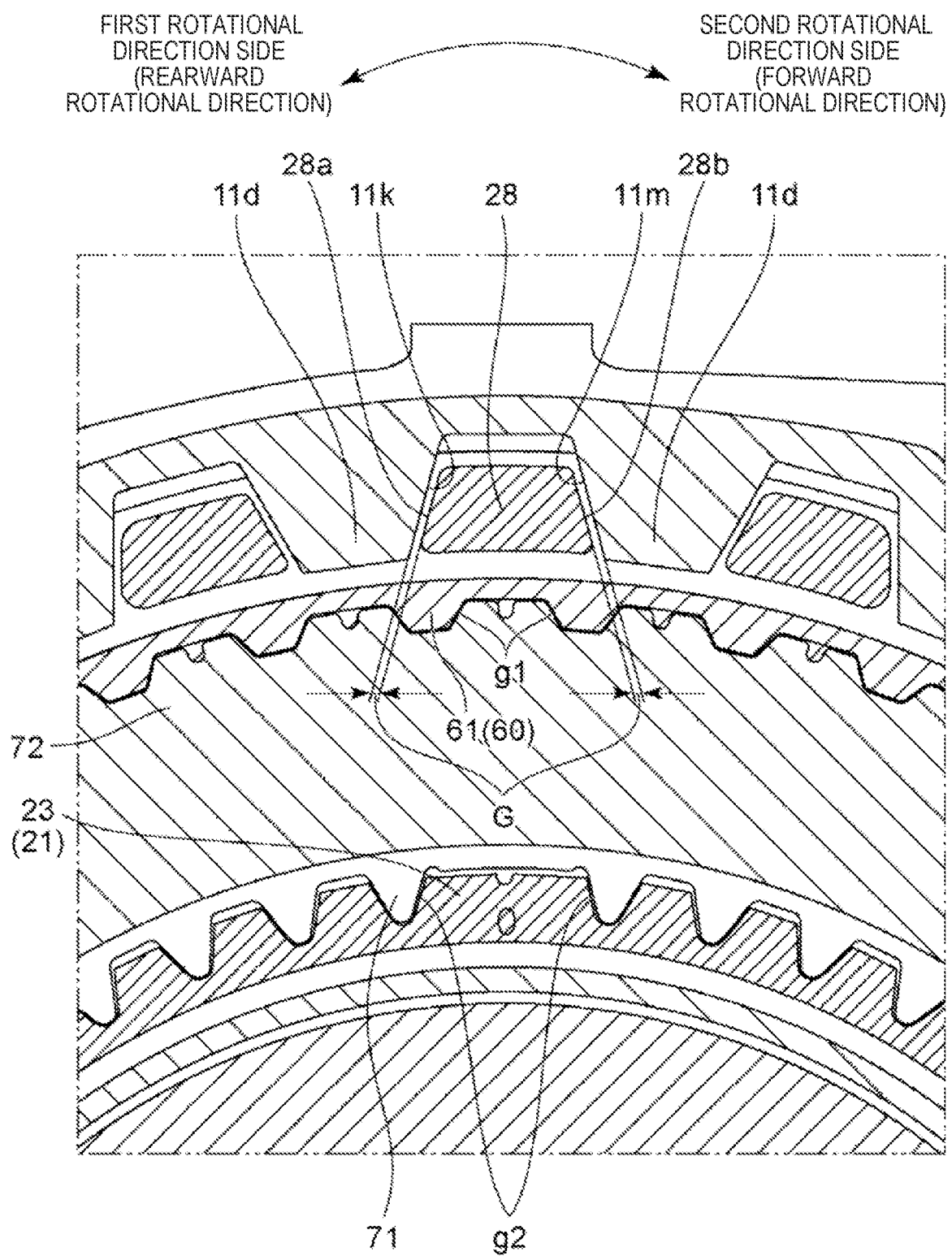
FIG. 7 is an enlarged view of a part indicated by an arrow VII of FIG. 6.

As illustrated in FIG. 6, the plurality of spline teeth 28 are engaged with the plurality of spline teeth 11d of the transmission case 11, respectively. As illustrated in FIG. 7, the gap (backlash) G for smooth meshing is provided between the spline tooth 11d and the spline tooth 28. The backlash G is provided between a tooth surface 28a at the first rotational direction side of the spline tooth 28 disposed between adjacent spline teeth 11d, and a tooth surface 11k at the second rotational direction side of the spline tooth 11d opposing to the tooth surface 28a, and between a tooth surface 28b at the second rotational direction side of the spline tooth 28, and a tooth surface 11m at the first rotational direction side of the spline tooth 11d opposing to the tooth surface 28b.

As illustrated in FIG. 6, the first damper spline tooth 26 is disposed in the first shock-absorbing-member accommodating space A1 of the transmission case 11, and the second damper spline tooth 27 is disposed in the second shock-absorbing-member accommodating space A2. The shock absorbing member 210 is attached to the first damper spline tooth 26, and the second shock absorbing member 220 is attached to the second damper spline tooth 27.

A first notch 29a is formed between the first damper spline tooth 26 of the first hub member 21 and the spline tooth 28 which is engaged with the second rotational direction side of the spline tooth 11e of the transmission case 11, and a second notch 29b is formed between the second damper spline tooth 27 of the first hub member 21 and the spline tooth 28 which is engaged with the first rotational direction side of the spline tooth 11g of the transmission case 11 (see FIG. 8).

As illustrated in FIG. 8, the second damper spline tooth 27 is formed in a stepped shape such that it is longer in the axial length from the second side to the first side in the rotational direction. The second damper spline tooth 27 is formed in the stepped shape by an attached part 27a which is located at the first rotational direction side and has the axial length for attaching the second shock absorbing member 220 thereto, an engaging part 27b which is located at the side of the spline tooth 11h of the transmission case 11 to be engaged with the spline tooth 11h, and has the substantially same axial length as the spline tooth 28, and a coupling part 27c which couples the attached part 27a to the engaging part 27b and has the axial length shorter than the attached part 27a and longer than the engaging part 27b. The attached part 27a is formed projecting mostly toward the anti-drive source side.

Figure 9:
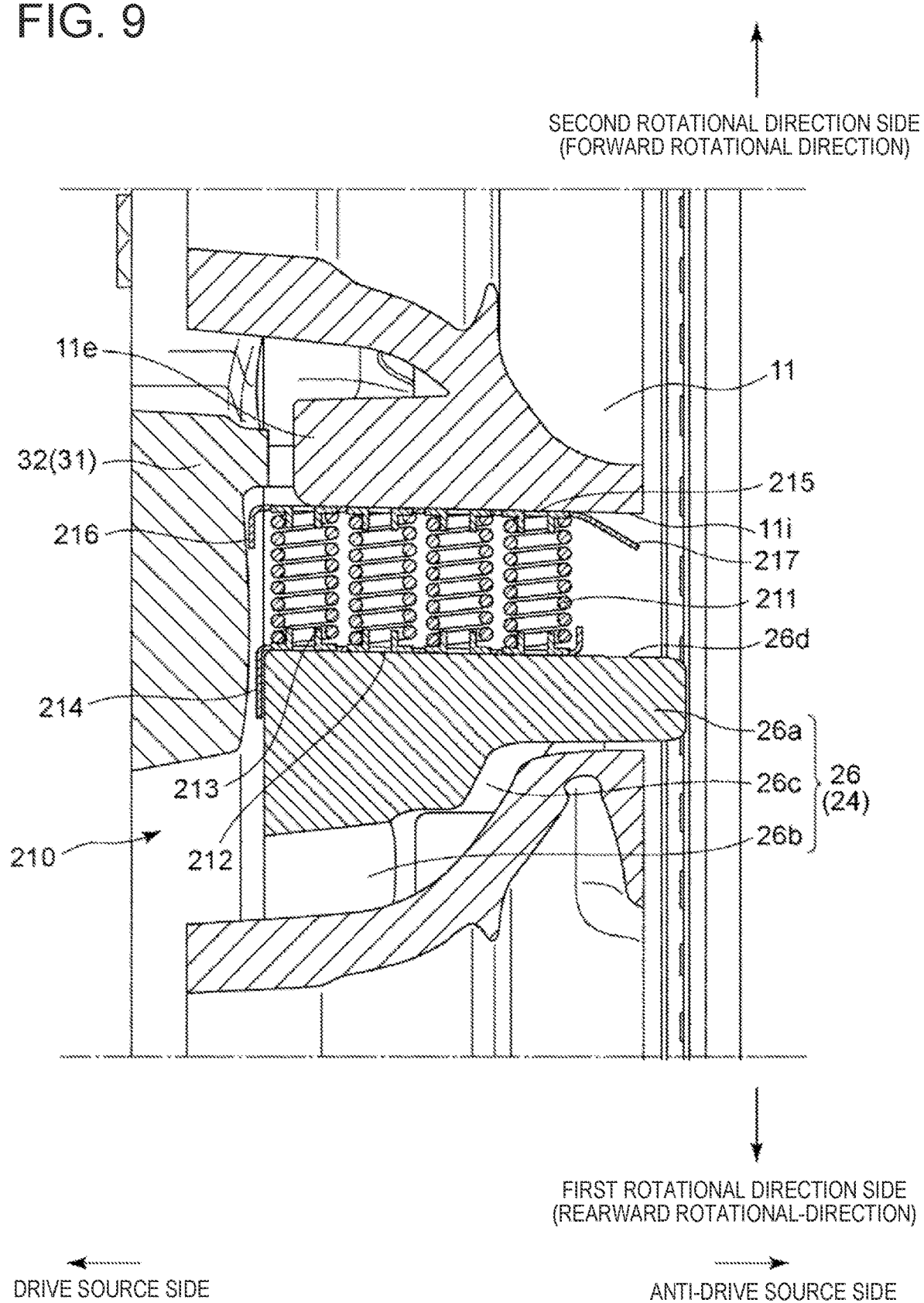
FIG. 9 is another cross-sectional view of the brake of the automatic transmission and the periphery thereof, taken along a line IX-IX of FIG. 6.

Similar to the second damper spline tooth 27, the first damper spline tooth 26 is formed in a stepped shape. As illustrated in FIG. 9, the first damper spline tooth 26 is formed in the stepped shape such that it is longer in the axial length from the first side to the second side in the rotational direction. The first damper spline tooth 26 is formed in the stepped shape by an attached part 26a which is located at the second rotational direction side and has the axial length for attaching the first shock absorbing member 210 thereto, an engaging part 26b which is located at the side of the spline tooth 11f of the transmission case 11 to be engaged with the spline tooth 11f, and has the substantially same axial length as the spline tooth 28, and a coupling part 26c which couples the attached part 26a to the engaging part 26b and has the axial length shorter than the attached part 26a and longer than the engaging part 26b. The attached part 26a is formed most projectingly to the anti-drive source side.

In the first notch 29a, the first shock absorbing member 210 and the spine tooth 11e of the transmission case 11 are arranged in the circumferential direction from the first side to the second side in the rotational direction. In the second notch 29b, the second shock absorbing member 220 and the spline tooth 11g of the transmission case 11 are arranged in the circumferential direction from the second side to the first side in the rotational direction (see FIG. 6).

As illustrated in FIGS. 8 and 9, the first shock absorbing member 210 is disposed between a tooth surface 26d of the first damper spline tooth 26 at the second rotational direction side, and a tooth surface 11i of the spline tooth 11e of the transmission case 11 at the first rotational direction side. The first shock absorbing member 210 is provided with a first spring 211 which causes a biasing force F1 to act on the first hub member 21 toward the first rotational direction side (see FIG. 6).

The first shock absorbing member 210 includes a plurality of first springs 211 each comprised of a coil spring extending in the circumferential direction, and arranged in the axial direction, a hub-side holding plate 212 which is made of a plate member extending in the axial direction and holds end parts of the plurality of first springs 211 at the first rotational direction side, and a case-side holding plate 215 which holds end parts of the plurality of first springs 211 at the second rotational direction side.

The hub-side holding plate 212 is provided with a plurality of spring guide parts 213 which cylindrically project toward the second rotational direction side, and to which the plurality of first springs 211 are attached. The case-side holding plate 215 is provided with a plurality of spring guide parts 213 which oppose to the spring guide parts 213 attached to the hub-side holding plate 212 and cylindrically project toward the first rotational direction side, and to which the plurality of first springs 211 are attached. The plurality of first springs 211 are disposed at positions overlapping with each other in the axial direction and the radial direction.

The first shock absorbing member 210 is attached to the first hub member 21 in a state where the hub-side holding plate 212 is supported by the tooth surface 26d of the first damper spline tooth 26 at the second rotational direction side, and the case-side holding plate 215 is supported by the tooth surface 11i of the spline tooth 11e of the transmission case 11 at the first rotational direction side.

The first shock absorbing member 210 is disposed between the first damper spline tooth 26 and the tooth surface 11i of the spline tooth 11e of the transmission case 11, while the plurality of first springs 211 are compressed.

In a state where the first shock absorbing member 210 is attached to the first damper spline tooth 26 of the first hub member 21 and before the first hub member 21 is assembled to the transmission case 11, the first springs 211 have the equilibrium length. The circumferential length of the first shock absorbing member 210 is set to be longer than the length obtained by subtracting the circumferential length of the first damper spline tooth 26 from the circumferential length of the first shock-absorbing-member accommodating space A1. Therefore, when the first hub member 21 is assembled to the transmission case 11, the plurality of first springs 211 are held while being compressed in the circumferential direction. The first springs 211 are held while load is applied thereto in advance.

As illustrated in FIG. 9, the hub-side holding plate 212 is provided with an extending part 214 which extends toward the first rotational direction side from an end part of the hub-side holding plate 212 at the drive source side, and contacts a drive source side surface of the spline tooth 26 provided to the vertical wall part 22 of the first hub member 21. A pin member (not illustrated) is projected from a driving-source-side surface of the vertical wall part 22 of the first hub member 21, and the extending part 214 is formed with a through-hole (not illustrated) penetrating in the axial direction so that the pin member is inserted therein, and thus, the first shock absorbing member 210 is held by the first hub member 21.

The case-side holding plate 215 includes a stopper part 216 which extends toward the first rotational direction side from an end part of the case-side holding plate 215 at the drive source side, and contacts an anti-drive source side surface of the spline tooth 26 provided to the vertical wall part 32 of the second hub member 31, and an inclined part 217 which extends from an end part of the case-side holding plate 215 at the anti-drive source side, toward the anti-drive source side while inclining toward the first rotational direction side.

As illustrated in FIGS. 6 and 8, the second shock absorbing member 220 is disposed between a tooth surface 27d of the second damper spline tooth 27 at the first rotational direction side, and a tooth surface 11j at the second rotational direction side of the spline tooth 11g disposed on the second rotational direction side of the upper range Z1. The second shock absorbing member 220 is provided with a second spring 221 which causes a biasing force F2 to act on the first hub member 21 toward the second rotational direction side (see FIG. 6).

The second shock absorbing member 220 includes a plurality of second springs 221 each comprised of a coil spring extending in the circumferential direction, and arranged in the axial direction, a hub-side holding plate 222 which is made of a plate member extending in the axial direction and holds end parts of the plurality of second springs 221 at the second rotational direction side, and a case-side holding plate 225 which holds end parts of the plurality of second springs 221 at the first rotational direction side.

The hub-side holding plate 222 is provided with a plurality of spring guide parts (not illustrated) which cylindrically project to the first rotational direction side, and to which the plurality of second springs 221 are attached. The case-side holding plate 225 is provided with a plurality of spring guide parts (not illustrated) which oppose to the spring guide parts attached to the hub-side holding plate 222 and cylindrically project toward the second rotational direction side, and to which the plurality of second springs 221 are attached. The plurality of second springs 221 are disposed at positions overlapping with each other in the axial direction and the radial direction.

The second shock absorbing member 220 is attached to the first hub member 21 in a state where the hub-side holding plate 222 is supported by the tooth surface 27d of the second damper spline tooth 27 at the first rotational direction side, and the case-side holding plate 225 is supported by the tooth surface 11j of the spline tooth 11g of the transmission case 11 at the second rotational direction side.

The second shock absorbing member 220 is disposed between the second damper spline tooth 27 and the tooth surface 11j of the spline tooth 11g of the transmission case 11, while the plurality of second springs 221 are compressed.

In a state where the second shock absorbing member 220 is attached to the second damper spline tooth 27 of the first hub member 21, and before the first hub member 21 is assembled to the transmission case 11, the second springs 221 have the equilibrium length. The circumferential length of the second shock absorbing member 220 is set to be longer than the length obtained by subtracting the circumferential length of the second damper spline tooth 27 from the circumferential length of the second shock-absorbing-member accommodating space A2. Therefore, when the first hub member 21 is assembled to the transmission case 11, the plurality of second springs 221 are held while being compressed in the circumferential direction. The second springs 221 are held while load is applied thereto in advance.

The hub-side holding plate 222 is provided with an extending part 224 which extends toward the second rotational direction side from an end part of the hub-side holding plate 222 at the drive source side, and contacts a drive source side surface of the spline tooth 27 provided to the vertical wall part 22 of the first hub member 21. A pin member (not illustrated) is projected from a drive source-side surface of the vertical wall part 22 of the first hub member 21, and the extending part 224 is formed with a through-hole (not illustrated) penetrating in the axial direction so that the pin member is inserted therein, and thus, the second shock absorbing member 220 is held by the first hub member 21.

The case-side holding plate 225 includes a stopper part 226 which extends to the second rotational direction side from an end part of the case-side holding plate 225 at the driving-source side, and contacts an anti-drive source side surface of the spline tooth 27 provided to the vertical wall part 32 of the second hub member 31, and an inclined part 227 which extends from an end part of the case-side holding plate 225 at the anti-drive source side, to the anti-drive source side while inclining to the second rotational direction side.

Figure 10A:
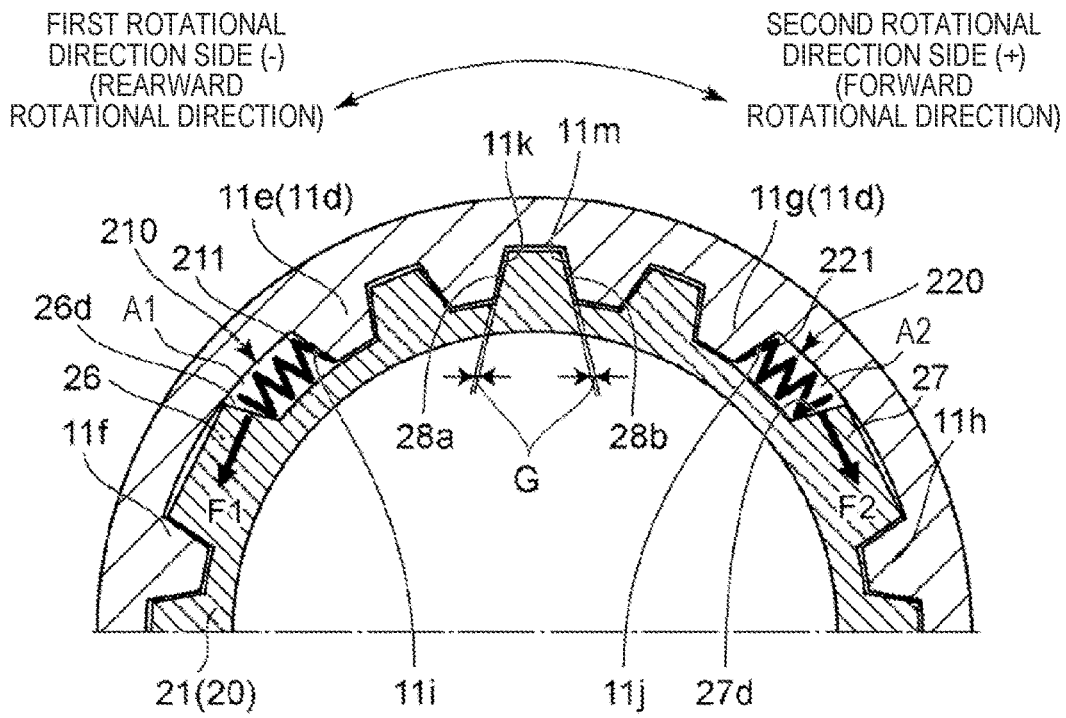
FIGS. 10A and 10B are partial cross-sectional views schematically illustrating the brake illustrated in FIG. 6 and a transmission case.
Figure 10B:
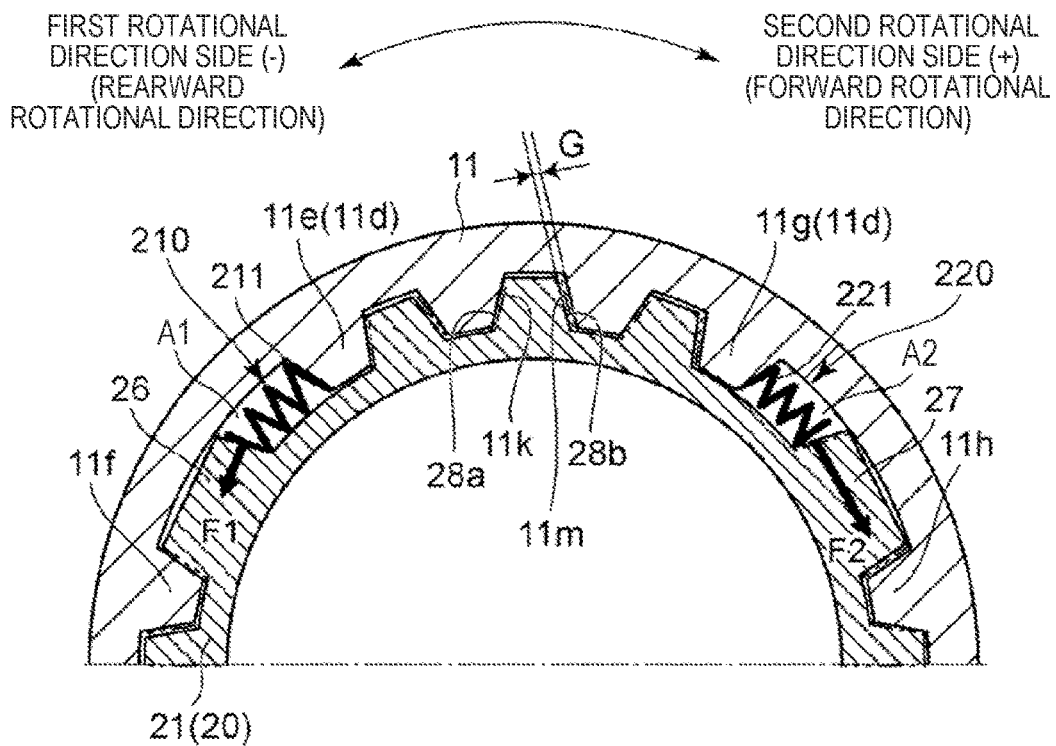

FIGS. 10A and 10B are partial cross-sectional views schematically illustrating the brake BR2 and the transmission case 11 illustrated in FIG. 6. Operations of the first spring 211 and the second spring 221 are described with reference to FIGS. 10A and 10B.

The first hub member 21 receives the biasing force F1 to the first rotational direction side by the first shock absorbing member 210, and receives the biasing force F2 to the second rotational direction side by the second shock absorbing member 220, in the state where the first hub member 21 is assembled to the transmission case 11.

As illustrated in FIG. 10A, spring constants and compression allowances for the first spring 211 and the second spring 221 are set such that, when the first hub member 21 is at a neutral position where torque is not acted thereon, the biasing force F1 of the first shock absorbing member 210 and the biasing force F2 of the second shock absorbing member 220, which act on the first hub member 21, cancel out each other. For example, since the number and the spring constant are set to be the same between the first springs 211 and the second springs 221, they have the same compression allowance at the neutral position where the torque is not acted on the first hub member 21. Suppose that, at the neutral position, the first rotational direction side is a negative direction, the second rotational direction side is a positive direction, the biasing force F1 of the first spring 211 is −500 N, the biasing force F2 of the second spring 221 is +500 N, and the spring constants of the first spring and the second spring are each 100 N/mm, the net force of the first spring 211 and the second spring 221 (F1+F2) which acts on the first hub member 21 is balanced, thus being 0 N.

At the neutral position where torque is not acted on the first hub member 21, the backlash G is provided between the tooth surface 28a at the first rotational direction side of the spline tooth 28 disposed between adjacent spline teeth 11d, and the tooth surface 11k at the second rotational direction side of the spline tooth 11d opposing to the tooth surface 28a, and between the tooth surface 28b at the second rotational direction side of the spline tooth 28, and the tooth surface 11m at the first rotational direction side of the spline tooth 11d opposing to the tooth surface 28b.

When torque is acted on the first hub member 21, and the first hub member 21 rotates to the first rotational direction side (negative direction), as illustrated in FIG. 10B, the load applied to the first spring 211 decreases whereas the load applied to the second spring 221 increases. For example, when the biasing force F1 of the first spring 211 is −400 N and the biasing force F2 of the second spring 221 is +600 N, the net force of the first spring 211 and the second spring 221 (F1+F2) which acts on the first hub member 21 becomes +200 N. Therefore, by the shock absorbing member 200, the first hub member 21 is applied with a load resisting the torque for rotating the first hub member 21 in the negative direction, and thus, the rotation of the first hub member 21 with respect to the transmission case 11 can be suppressed.

When the torque is acted on the first hub member 21, and the first hub member 21 rotates to the first rotational direction side (negative direction), the backlash G between the tooth surface 28a at the first rotational direction side of the spline tooth 28 disposed between the adjacent spline teeth 11d, and the tooth surface 11k at the second rotational direction side of the spline tooth 11d opposing to the tooth surface 28a is eliminated, and the backlash G is provided only between the tooth surface 28b at the second rotational direction side of the spline tooth 28, and the tooth surface 11m at the first rotational direction side of the spline tooth 11d opposing to the tooth surface 28b.

Note that, here, although the case where the first hub member 21 rotates to the first rotational direction side (negative direction) is described, also in the case where the first hub member 21 rotates to the second rotational direction side (positive direction), the load can similarly be applied by the shock absorbing member 200 in the opposite direction from the rotational direction of the first hub member 21 relative to the transmission case 11. Therefore, the rotation of the first hub member 21 with respect to the transmission case 11 can be suppressed.

Figure 12:
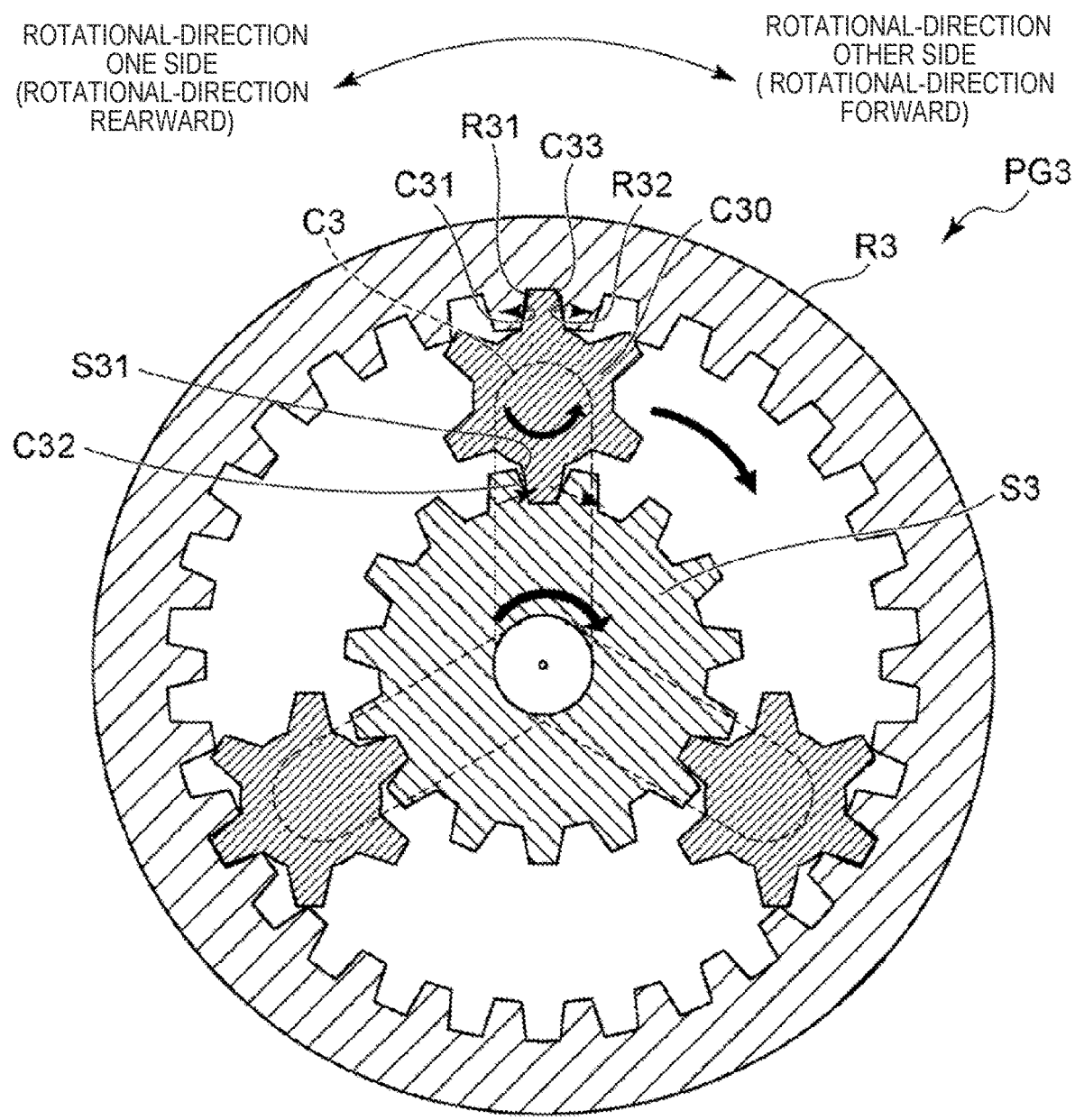
FIG. 12 is a view schematically illustrating a third planetary gear set.
Figure 13A:
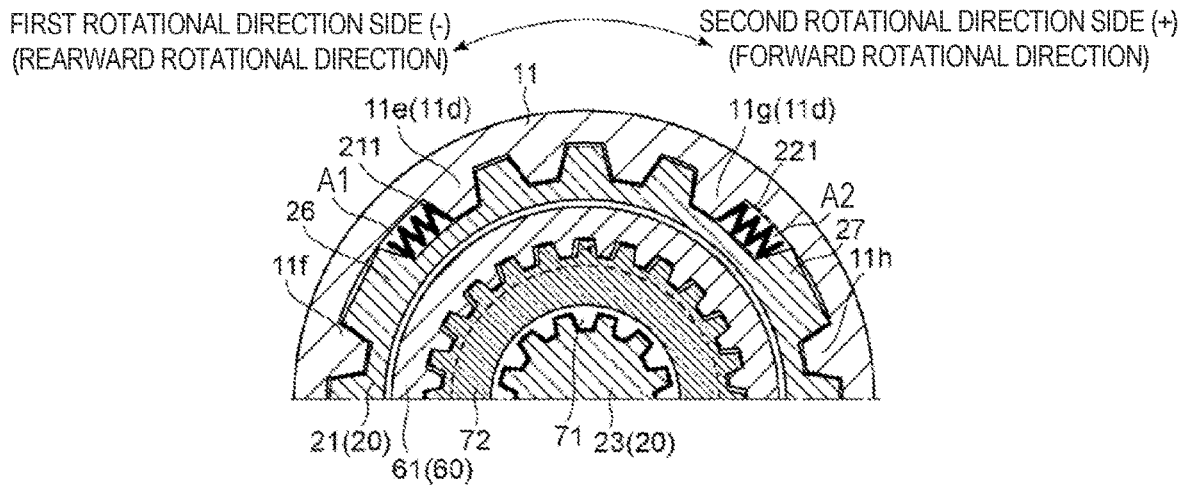
FIGS. 13A to 13C are explanatory views of torque transmitted from a drum member to the first hub member via a friction plate.
Figure 13B:
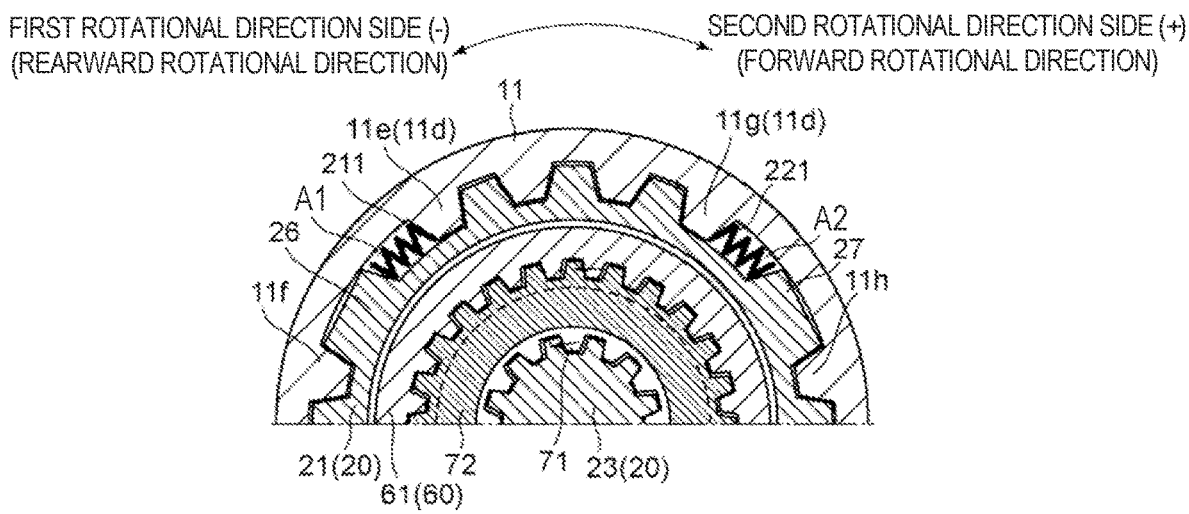
Figure 13C:
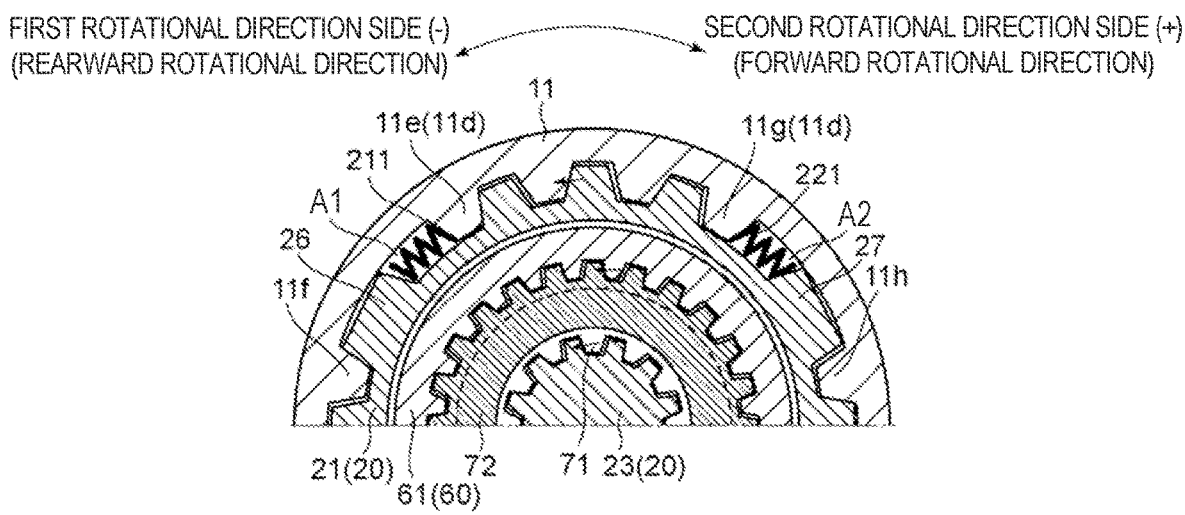

Next, teeth rattling noise caused between the spline part 11a of the transmission case 11 and the spline part 24 of the first hub member 21 is described with reference to FIGS. 11, 12, and 13A to 13C. FIG. 12 is a view schematically illustrating a cross section of the third planetary gear set PG3 in the axial direction, and FIGS. 13A to 13C are cross-sectional views schematically illustrating the brake BR2 and the transmission case 11 in the axial direction.

Figure 11:
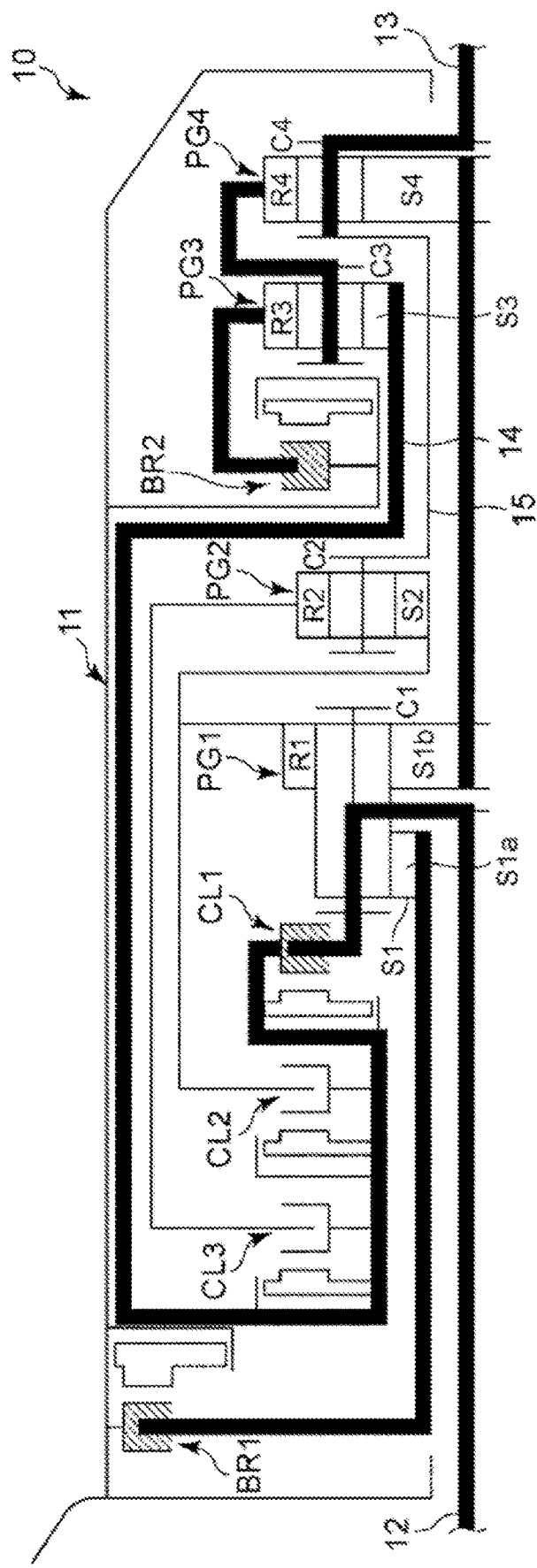
FIG. 11 is a view schematically illustrating the automatic transmission at the 1st gear.

As illustrated in FIG. 11, at the first gear of the automatic transmission 10, the first brake BR1, the second brake BR2, and the first clutch CL1 are engaged. At the first gear, the third planetary gear set PG3 receives input torque from the engine side by the sun gear S3. Since the brake is engaged, the ring gear R3 coupled to the rotation-side cylindrical member is fixed, and the input torque from the engine is transmitted to a drive wheel from the carrier C3 via the fourth planetary gear set PG4, while receiving reaction force of the ring gear R3 from the sun gear S3.

As illustrated in FIG. 12, in the third planetary gear set PG3, a tooth surface S31 at the second rotational direction side (forward) of the sun gear S3 which is rotated by receiving the input from the engine, contacts a tooth surface C32 at the first rotational direction side (rearward) of a pinion gear C30 which is located between tooth surfaces of the sun gear S3 and coupled to the carrier C3, and thus, the pinion gear C30 is rotated. The rotation of the pinion gear C30 is transmitted to the ring gear R3 by a tooth surface C31 at the rearward rotational direction of the tooth of the pinion gear C30 which is located between the tooth surfaces of the ring gear R3 contacting a tooth surface R31 of the ring gear R3 at the forward rotational direction.

Although the rotation transmitted to the ring gear R3 attempts to rotate the drum member 60 connected to the ring gear R3, since the brake BR2 is engaged, the rotation of the drum member 60 is received by the transmission case 11 via the fixed-side friction plates 71, the rotation-side friction plates 72, and the first hub member 21.

As illustrated in FIG. 13A, the rotation transmitted to the drum member 60 is transmitted to the rotation-side friction plate 72 by the drum member 60 being rotated in a direction in which the gap (backlash) between a tooth surface of the drum member 60 at the first rotational direction side (rearward) and a tooth surface of the rotation-side friction plate 72 at the second rotational direction side (forward) becomes smaller, and the tooth surface of the drum member 60 contacting the tooth surface of the rotation-side friction plate 72.

As illustrated in FIG. 13B, the rotation transmitted to the rotation-side friction plate 72 is transmitted to the fixed-side friction plate 71 which rotates integrally with the rotation-side friction plate 72, and then transmitted to the first hub member 21 by the fixed-side friction plate 71 being rotated in a direction in which the gap (backlash) between a tooth surface of the fixed-side friction plate 71 at the first rotational direction side and a tooth surface of the cylindrical part 23 of the first hub member 21 at the second rotational direction side becomes smaller, and the tooth surface of the fixed-side friction plate 71 contacting the tooth surface of the cylindrical part 23.

As illustrated in FIG. 13C, the rotation transmitted to the first hub member 21 is received by the first hub member 21 being rotated in a direction in which the gap (backlash) between a tooth surface of the spline part 24 of the first hub member 21 at the first rotational direction side and a tooth surface of the spline part 11a of the transmission case 11 at the second rotational direction side is reduced, and the tooth surface of the spline part 24 contacting the tooth surface of the spline part 11a of the transmission case 11.

As described above, teeth rattling noise caused upon the reduction in the backlash between the tooth surfaces of the drum member 60 and the rotation-side friction plate 72 is absorbed by the rotation of the rotation-side friction plate 72 and the fixed-side friction plate 71, and teeth rattling noise caused upon the reduction in the backlash between the fixed-side friction plate 71 and the cylindrical part 23 of the first hub member 21 is absorbed by the rotation of the first hub member 21.

On the other hand, the rotation of the first hub member 21 is received by the transmission case 11 which does not rotate, and thus, between the tooth surfaces of the first hub member 21 and the transmission case 11, teeth rattling noise larger than other parts is caused.

The backlash G between the tooth surfaces of the first hub member 21 and the transmission case 11 is set to be larger than other parts so as to absorb the backlashes g1 and g2 at other parts (see FIG. 7). Therefore, when the input torque is to be transmitted from the engine to the drive wheel, the backlash G is rapidly made smaller by the torque inputted into the ring gear R3, and the tooth surface 28a of the first hub member 21 at the first rotational direction side and the tooth surface 11k of the transmission case 11 at the second rotational direction side instantaneously collide with each other, which causes the teeth rattling noise.

According to the automatic transmission of this embodiment, since the shock absorbing member 200 is disposed between the spline part 11a of the transmission case 11 and the spline part 24 of the first hub member 21, the impact when the first hub member 21 rotates relative to the transmission case 11 and collides against it, can be reduced. As a result, the teeth rattling noise upon the contact between the tooth surface of the first hub member 21 and the tooth surface of the transmission case 11 can be reduced.

For example, while the brake BR2 is engaged and the input torque from the engine is transmitted to the first hub member 21 via the sun gear S3, the drum member 60, and the plurality of friction plates 70, when the first hub member 21 is rotated to the first rotational direction side (negative direction) by the drive force transmitted to the first hub member 21, as illustrated in FIG. 10B, the load applied to the first spring 211 decreases whereas the load applied to the second spring 221 increases. Therefore, the first hub member 21 is applied with the load which resists the torque for rotating the first hub member 21 in the negative direction, and thus, the rotation of the first hub member 21 with respect to the transmission case 11 can be reduced, and the teeth rattling noise between the first hub member 21 and the transmission case 11 can be reduced.

The teeth rattling noise between the first hub member 21 and the transmission case 11 is likely to occur, for example, during switching between a driving state and a driven state of the engine (in detail, a case of using engine braking during the traveling, or re-acceleration after the engine braking). In the driving state, an accelerator pedal is depressed and a vehicle travels while drive force of the engine is transmitted to the drive wheel, and in the driven state, the accelerator pedal is not depressed and the rotating force is transmitted from the drive wheel to the engine by coasting of the drive wheel.

When the driving and driven states are switched, the state as illustrated in FIG. 12, where the tooth surface S31 at the forward rotational direction of the sun gear S3 which is rotated by the engine contacts the tooth surface C32 of the pinion gear C30 at the rearward rotational direction, and the tooth surface C31 of the pinion gear C30 at the rearward rotational direction contacts the tooth surface R31 of the ring gear R3 at the forward rotational direction, becomes a state where a tooth surface C33 at the forward rotational direction of a tooth of the pinion gear C30 located between the tooth surfaces of the ring gear R3 contacts a tooth surface R32 of the ring gear R3 at the rearward rotational direction.

Here, since the contacting tooth surface is switched from the tooth surface R31 at the forward rotational direction to the tooth surface R32 at the rearward rotational direction, when the torque is transmitted to the drum member 60 coupled to the ring gear R3, the tooth surface to which torque is transmitted is switched between the state where the tooth surface 28a of the first hub member 21 at the rearward rotational direction contacts the tooth surface 11k of the transmission case 11 at the forward rotational direction, and the state where the tooth surface 28b of the first hub member 21 at the forward rotational direction contacts the tooth surface 11m of the transmission case 11 at the rearward rotational direction.

When the tooth surface which transmits the torque is switched, the state is changed from the state as illustrated in FIG. 10B, where the backlash between the tooth surface 28a at the rearward rotational direction of the spline tooth 28 disposed between the adjacent spline teeth 11d, and the tooth surface 11k at the forward rotational direction of the spline tooth 11d opposing to the tooth surface 28a is eliminated, and the backlash between the tooth surface 28b at the forward rotational direction of the spline tooth 28, and the tooth surface 11m at the rearward rotational direction of the spline tooth 11d opposing to the tooth surface 28b becomes the maximum, to a state where the tooth surface 28b of the spline tooth 28 is in contact with the tooth surface 11m of the spline tooth 11d. Therefore, the teeth rattling noise upon the collision between the tooth surfaces is likely to be louder.

In this respect, the automatic transmission 10 of this embodiment is provided with the first shock absorbing member 210 disposed between the tooth surface 26d of the spline part 24 of the first hub member 21 at the forward rotational direction in the driving state, and the tooth surface 11i of the spline part 11a of the transmission case 11 at the rearward rotational direction in the driving state, and the second shock absorbing member 220 disposed between the tooth surface 27d of the spline part 24 of the first hub member 21 at the rearward rotational direction in the driving state, and the tooth surface 11j of the spline part 11a of the transmission case 11 at the forward rotational direction in the driving state. Therefore, the teeth rattling noise caused upon the change in the tooth surface which receives torque (e.g., upon the switching between the driving and driven states, which is likely to increase backlash), can be reduced.

The spring constant of the shock absorbing member 200 is set based on the net spring constant of the first spring 211 and the second spring 221. Therefore, compared with a case where the shock absorbing member 200 is comprised of either one of the first shock absorbing member 210 and the second shock absorbing member 220, the teeth rattling noise can be reduced without excessively increasing the spring constant of the first shock absorbing member 210 or the second shock absorbing member 220. Moreover, compared with the case where only the first shock absorbing member 210 or the second shock absorbing member 220 is provided, the spring constant of each of the first shock absorbing member 210 and the second shock absorbing member 220 can be reduced, thus the assembling of the shock absorbing member 200 being easier.

Since the shock absorbing member 200 is disposed in the compressed state, the state where the shock absorbing member 200 is applied with load beforehand (preload) can be achieved in the neutral state where the torque is not inputted into the first hub member 21. Therefore, compared with a case where the shock absorbing member 200 is not applied with load beforehand, the load required for rotating the first hub member 21 with respect to the transmission case 11 is increased, and the rotation of the first hub member 21 relative to the transmission case 11 can be reduced.

Further, compared with the case where the shock absorbing member 200 is not applied with load beforehand, the rotation of the first hub member 21 with respect to the transmission case 11 can be reduced even when larger torque is inputted into the first hub member 21. For example, like the automatic transmission 10 of this embodiment, when a path length of the power transmission member 14 which couples the sun gear S3 and the first clutch CL1 is made longer in order to increase the number of gear stages for improving fuel efficiency, the inertia of the power transmission member 14 becomes larger and the torque inputted into the first hub member 21 is increased. However, since the shock absorbing member 200 is applied with load beforehand, the rotation of the first hub member 21 with respect to the transmission case 11 can be suppressed.

Since the position of the first hub member 21 in the axial direction is regulated by the second hub member 31 fixed to the transmission case 11, the structure where the first hub member 21 is spline-coupled to the transmission case 11 is easily achieved.

The drum member 60 is disposed opposing, and radially outward of, the first hub member 21. Therefore, compared with a case where the drum member 60 is disposed radially inward, the centrifugal force caused by the rotation of the drum member 60 disposed radially outward can efficiently lubricate the friction plates 70.

FIGS. 14A to 14D illustrate a method of assembling the first hub member 21 to the transmission case 11. As illustrated in FIGS. 14A to 14D, the first hub member 21 is attached to the transmission case 11 from the drive source side to the anti-drive source side while the first damper spline tooth 26 holds the first shock absorbing member 210.

The transmission case 11 is made of casting removed or pulled out from a mold from an anti-drive source side (a first axial direction side) to the drive source side (a second axial direction side), and a draft angle is provided to the spline part 11a of the transmission case 11. The transmission case 11 is formed such that an interval (gap) between the adjacent spline teeth 11d increases from the first axial direction side to the second axial direction side. Note that in this embodiment a draft angle α provided to the spline teeth 11d of the transmission case 11 is 1° with respect to a line segment L along the axial line.

Therefore, when the first hub member 21 and the first shock absorbing member 210 are assembled to the spline part 11a of the transmission case 11 from the second axial direction side to the first axial direction side, they can be assembled while the first shock absorbing member 210 is gradually compressed from the second axial direction side to the first axial direction side. Accordingly, compared to a case where the shock absorbing member is assembled to a spline tooth with a constant width in the circumferential direction while maintaining the compressed state which is set for after assembly, the assembling can be easier.

Figure 14A:
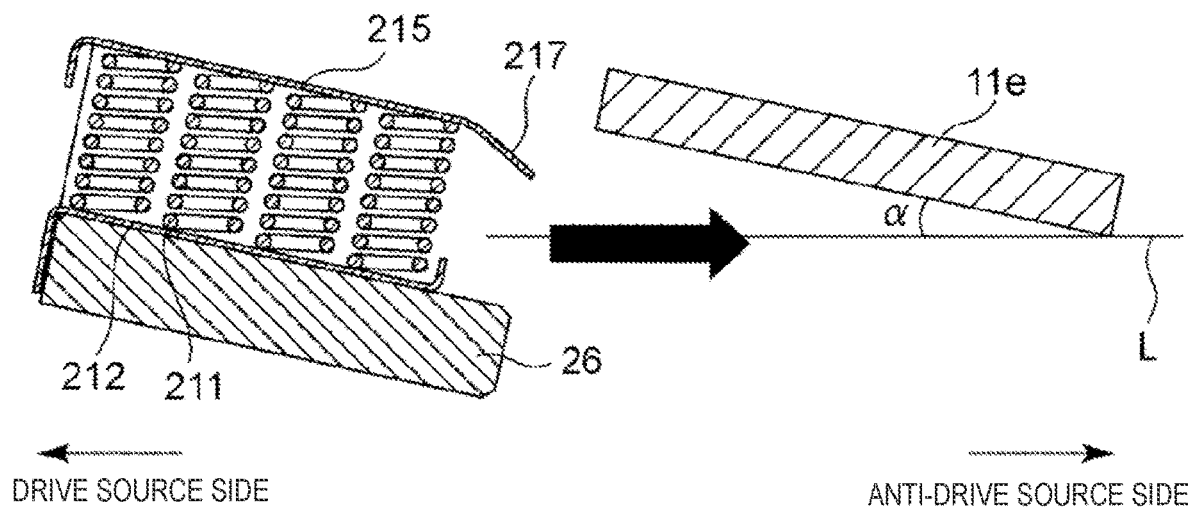
FIGS. 14A to 14D are explanatory views of assembling method of the first hub member and a first shock absorbing member of the brake.

For example, as illustrated in FIG. 14A, before the first spring 211 is assembled to the transmission case 11, it is held in the equilibrium length, and thus, the total length of the first damper spline tooth 26 and the first shock absorbing member 210 in the circumferential direction is longer than the length of the first shock-absorbing-member accommodating space A1 in the circumferential direction.

Figure 14B:
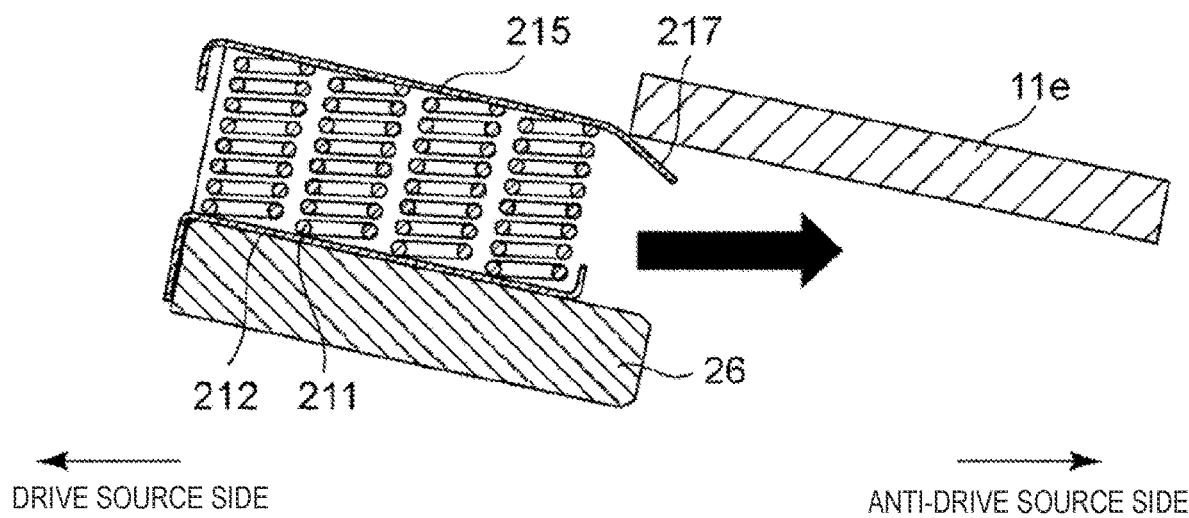

As illustrated in FIG. 14B, when the first hub member 21 is moved from the drive source side to the anti-drive source side so as to be assembled to the transmission case 11, the inclined part 217 of the case-side holding plate 215 first contacts the spline tooth 11e of the transmission case 11.

Figure 14C:
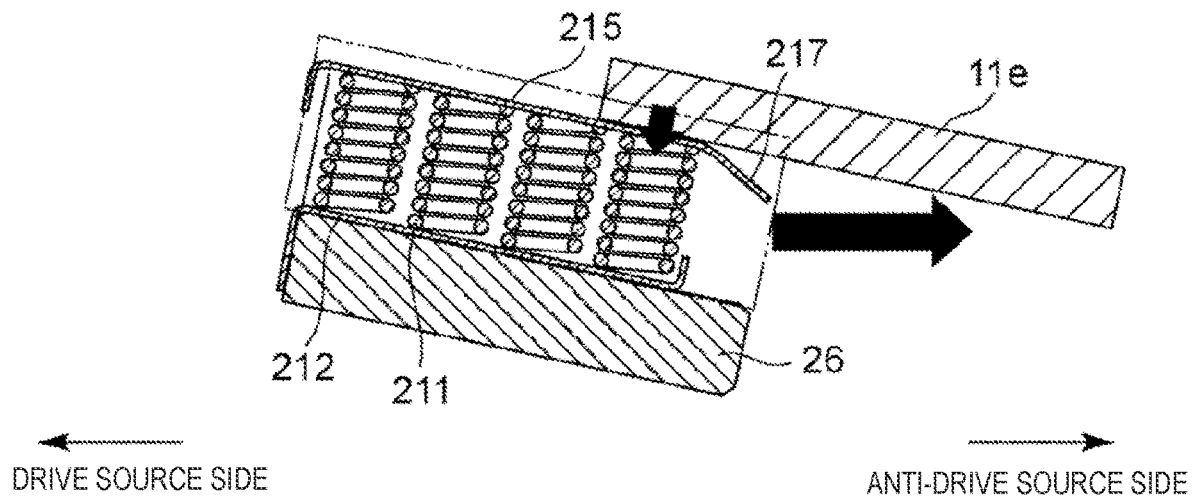

As illustrated in FIG. 14C, when the first hub member 21 is inserted along the inclined part 217, the first hub member 21 is moved to the anti-drive source side while the first spring 211 is compressed. As described above, since the spline tooth 11d is formed such that its width in the circumferential direction becomes narrower to the drive source side, the first hub member 21 is assembled while the compression allowance of the first spring 211 increases from the drive source side to the anti-drive source side.

Figure 14D:
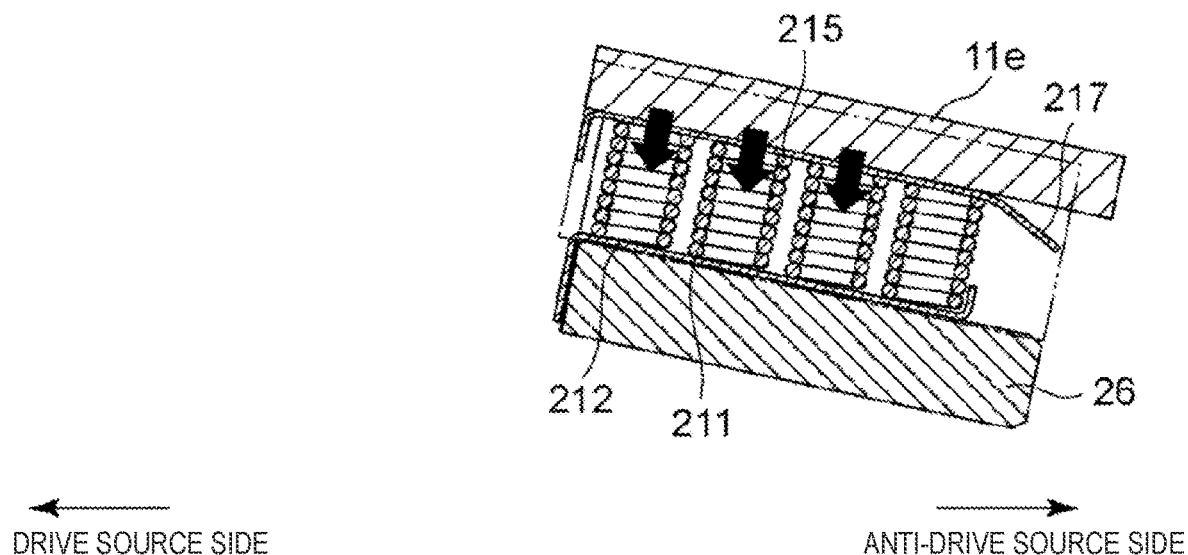

As illustrated in FIG. 14D, when the first hub member 21 and the first spring 211 are assembled to the transmission case 11, the first spring 211 is assembled while being compressed and applied with load beforehand. Since the draft a is formed in the spline tooth 11d of the transmission case 11, in the state where the first hub member 21 and the first spring 211 are assembled to the transmission case 11, the biasing force of the first spring 211 generates force which acts on the first hub member 21 and the first spring 211 to come out from the transmission case 11 to the drive source side. With respect to this, the draft is set to be smaller than a given value (e.g., 1°) such that the force caused by the draft a to act on the first hub member 21 in the axial direction becomes smaller than a friction force between the first hub member 21 and the tooth surface of the transmission case 11.

The present disclosure is not limited to the embodiment described above, but various improvement and changes in design are possible without departing from the spirit of the present disclosure.

For example, although in this embodiment the shock absorbing member 200 includes the first shock absorbing member 210 and the second shock absorbing member 220, either one of the first shock absorbing member 210 and the second shock absorbing member 220 may be provided. In this case, the spring constant of the shock absorbing member may be increased compared with the case where both of the first shock absorbing member 210 and the second shock absorbing member 220 are provided.

Moreover, in this embodiment, the first shock absorbing member 210 and the second shock absorbing member 220 are disposed in the first shock-absorbing-member accommodating space A1 and the second shock-absorbing-member accommodating space A2, respectively. However, for example, the first shock absorbing member 210 and the second shock absorbing member 220 may be disposed in the first shock-absorbing-member accommodating space A1, as long as the first shock absorbing member 210 and the second shock absorbing member 220 are disposed between the tooth surface of the spline part of the transmission case 11 at the second rotational direction side, and the tooth surface of the spline part of the first hub member at the first rotational direction side, and between the tooth surface of the spline part of the transmission case 11 at the first rotational direction side, and the tooth surface of the spline part of the first hub member at the second rotational direction side, respectively.

As described above, according to the present disclosure, an automatic transmission provided with a brake having a fixed-side cylindrical member to be spline-coupled to a transmission case, can reduce teeth rattling noise between the transmission case and the fixed-side cylindrical member. Therefore, the present disclosure may be suitably used in a technical field of manufacturing this type of automatic transmission or a vehicle mounting the automatic transmission thereon.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
11 Transmission Case
11i Tooth Surface of Transmission Case at First Rotational Direction Side
11j Tooth Surface of Transmission Case at Second Rotational Direction Side
21 First Hub Member (Fixed-side Cylindrical Member)
26d Tooth Surface of Fixed-Side Cylindrical Member at Second Rotational Direction Side
27d Tooth Surface of Fixed-Side Cylindrical Member at First Rotational Direction Side
11a, 24 Spline Part
31 Second Hub Member (Fixed-side Holding Member)
61 Drum Member (Rotation-side Cylindrical Member)
70 Plurality of Friction Plates
71 Fixed-side Friction Plate
72 Rotation-side Friction Plate 80 Piston
200 Shock Absorbing Member
210 First Shock Absorbing Member
211 First Spring
220 Second Shock Absorbing Member
221 Second Spring
BR2 Brake
R3 Ring Gear (Given Rotating Member)

What is claimed is:

1. An automatic transmission, comprising:
a brake including:
   a fixed-side cylindrical member spline-coupled to a transmission case;
   a rotation-side cylindrical member coupled to a given rotating member;
   a plurality of friction plates disposed between the fixed-side cylindrical member and the rotation-side cylindrical member, and including a fixed-side friction plate configured to be spline-engaged with the fixed-side cylindrical member and a rotation-side friction plate configured to be spline-engaged with the rotation-side cylindrical member; and
   a piston configured to engage the plurality of friction plates; and
a shock absorbing member disposed between a spline part of the transmission case and a spline part of the fixed-side cylindrical member and configured to absorb impact when the fixed-side cylindrical member rotates relative to the transmission case, wherein the shock absorbing member includes:
a first shock absorbing member disposed between a tooth surface of the spline part of the transmission case at a first side in a rotational direction, and a tooth surface of the spline part of the fixed-side cylindrical member at a second side in the rotational direction; and
a second shock absorbing member disposed between a tooth surface of the spline part of the transmission case at the second side in the rotational direction, and a tooth surface of the spline part of the fixed-side cylindrical member at the first side in the rotational direction.

2. The automatic transmission of claim 1, wherein a position of the fixed-side cylindrical member is regulated in an axial direction by a fixed-side holding member fixed to the transmission case.

3. The automatic transmission of claim 2, wherein the rotation-side cylindrical member is disposed opposing, and radially outward of, the fixed-side cylindrical member.

4. The automatic transmission of claim 2,
wherein the first shock absorbing member includes a first spring being a coil spring, and the second shock absorbing member includes a second spring being a coil spring, and
wherein a spring constant of the shock absorbing member including the first shock absorbing member and the second shock absorbing member is set based on a net spring constant of the first spring and the second spring.

5. The automatic transmission of claim 2, wherein the shock absorbing member is disposed in a compressed state.

6. The automatic transmission of claim 2, wherein a spline tooth of the spline part of the transmission case is formed such that the width in a circumferential direction becomes narrower from a first side to a second side in the axial direction.

7. The automatic transmission of claim 1,
wherein the first shock absorbing member includes a first spring being a coil spring, and the second shock absorbing member includes a second spring being a coil spring, and
wherein a spring constant of the shock absorbing member including the first shock absorbing member and the second shock absorbing member is set based on a net spring constant of the first spring and the second spring.

8. The automatic transmission of claim 7, wherein the shock absorbing member including the first shock absorbing member and the second shock absorbing member is disposed in a compressed state.

9. The automatic transmission of claim 8, wherein a spline tooth of the spline part of the transmission case is formed such that the width in a circumferential direction becomes narrower from a first side to a second side in the axial direction.

10. The automatic transmission of claim 1, wherein the rotation-side cylindrical member is disposed opposing, and radially outward of, the fixed-side cylindrical member.

11. The automatic transmission of claim 1, wherein the shock absorbing member is disposed in a compressed state.

12. The automatic transmission of claim 11, wherein a spline tooth of the spline part of the transmission case is formed such that the width in a circumferential direction becomes narrower from a first side to a second side in an axial direction.

13. An automatic transmission, comprising:
a brake including:
   a fixed-side cylindrical member spline-coupled to a transmission case;
   a rotation-side cylindrical member coupled to a given rotating member:
   a plurality of friction plates disposed between the fixed-side cylindrical member and the rotation-side cylindrical member, and including a fixed-side friction plate configured to be spline-engaged with the fixed-side cylindrical member and a rotation-side friction plate configured to be spline-engaged with the rotation-side cylindrical member; and
   a piston configured to engage the plurality of friction plates; and
a shock absorbing member disposed between a spline part of the transmission case and a spline part of the fixed-side cylindrical member and configured to absorb impact when the fixed-side cylindrical member rotates relative to the transmission case, wherein
a spline tooth of the spline part of the transmission case is formed such that the width in a circumferential direction becomes narrower from a first side to a second side in an axial direction.

14. The automatic transmission of claim 13, wherein a position of the fixed-side cylindrical member is regulated in an axial direction by a fixed-side holding member fixed to the transmission case.

15. The automatic transmission of claim 13, wherein the rotation-side cylindrical member is disposed opposing, and radially outward of, the fixed-side cylindrical member.

16. The automatic transmission of claim 1, wherein a spline tooth of the spline part of the transmission case is formed such that the width in a circumferential direction becomes narrower from a first side to a second side in an axial direction.

* * * * *